(12) United States Patent
Beaver

(10) Patent No.: US 11,163,961 B2
(45) Date of Patent: Nov. 2, 2021

(54) DETECTION OF RELATIONAL LANGUAGE IN HUMAN-COMPUTER CONVERSATION

(71) Applicant: Verint Americas, Alpharetta, GA (US)

(72) Inventor: Ian Roy Beaver, Spokane, WA (US)

(73) Assignee: VERINT AMERICAS INC., Alpharetta, GA (US)

(*) Notice: Subject to any disclaimer, the term of this patent is extended or adjusted under 35 U.S.C. 154(b) by 4 days.

(21) Appl. No.: 16/402,174

(22) Filed: May 2, 2019

(65) Prior Publication Data

US 2019/0340243 A1 Nov. 7, 2019

Related U.S. Application Data

(60) Provisional application No. 62/665,566, filed on May 2, 2018.

(51) Int. Cl.
*G06F 40/30* (2020.01)
*G06F 16/248* (2019.01)
*G06F 16/2457* (2019.01)

(52) U.S. Cl.
CPC ............ *G06F 40/30* (2020.01); *G06F 16/248* (2019.01); *G06F 16/24575* (2019.01)

(58) Field of Classification Search
CPC .... G06F 40/30; G06F 40/284; G06F 16/3344; G06F 19/326; G06F 19/3418; G06F 3/048; G06F 16/2425; G06F 16/2465; G06F 16/332; G06F 16/3329; G06F 16/3349; G06F 16/90332; G06F 16/90335; G06F 40/35; G06F 16/248; G06F 40/20; G06F 16/24575; G06F 16/3334; G06F 16/338; G06F 40/205; G06F 16/2457
See application file for complete search history.

(56) References Cited

U.S. PATENT DOCUMENTS

| | | |
|---|---|---|
| 5,918,222 A | 6/1999 | Fukui et al. |
| 9,715,875 B2 | 7/2017 | Piernot et al. |
| 10,170,116 B1 | 1/2019 | Kelly et al. |
| 10,909,124 B2 * | 2/2021 | Lim .................... G06F 16/9535 |
| 2013/0282682 A1 * | 10/2013 | Batraski ................ G06F 16/951 |
| | | 707/706 |
| 2014/0074454 A1 * | 3/2014 | Brown .................... G10L 15/22 |
| | | 704/9 |
| 2015/0348549 A1 | 12/2015 | Giuli et al. |
| 2016/0350426 A1 * | 12/2016 | Wu ....................... G06F 16/3322 |
| 2017/0068670 A1 | 3/2017 | Orr et al. |
| 2018/0060326 A1 * | 3/2018 | Kuo ....................... G06Q 50/01 |

(Continued)

OTHER PUBLICATIONS

Beaver, I., et al., "An Annotated Corpus of Relational Strategies in Customer Service," arXiv.org, Cornell University Library, XP080953431, 2017, 19 pages.

(Continued)

*Primary Examiner* — Huyen X Vo
(74) *Attorney, Agent, or Firm* — Meunier Carlin & Curfman LLC

(57) ABSTRACT

Virtual assistants intelligently emulate a representative of a service provider by providing variable responses to user queries received via the virtual assistants. These variable responses may take the context of a user's query into account both when identifying an intent of a user's query and when identifying an appropriate response to the user's query.

9 Claims, 15 Drawing Sheets

(56) References Cited

U.S. PATENT DOCUMENTS

| | | | |
|---|---|---|---|
| 2018/0101533 A1* | 4/2018 | Robichaud | G06F 16/9535 |
| 2018/0330721 A1* | 11/2018 | Thomson | G10L 15/1815 |
| 2019/0354594 A1 | 11/2019 | Foster et al. | |

OTHER PUBLICATIONS

Ballantyne, D., "Dialogue and its role in the development of relationship specific knowledge," Journal of Business & Industrial Marketing, vol. 19, No. 2, 2004, pp. 114-123.

Bickmore, T., et al., "Relational Agents: A Model and Implementation of Building User Trust," Proceedings of the SIGCHI Conference on Human Factors in Computing Systems (CHI '01), ACM, 2001, pp. 396-403.

Chai, J.Y., et al., "Towards Conversational QA: Automatic Identification of Problematic Situations and User Intent," Proceedings of the COLING/ACL 2006 Main Conference Poster Sessions, Association for Computational Linguistics, 2006, pp. 57-64.

Coppola, N.W. et al., "Building Trust in Virtual Teams," IEEE Transactions on Professional Communication, vol. 47, No. 2, 2004, pp. 95-104.

De Visser, E.J., et al., "Almost Human: Anthropomorphism Increases Trust Resilience in Cognitive Agents," Journal of Experimental Psychology: Applied, 2016, 19 pages.

Holton, J.A., "Building trust and collaboration in a virtual team," Team Performance Management: An International Journal, vol. 7, Nos. 3 and 4, 2001, pp. 36-47.

Kim, B., et al., "Two-stage multi-intent detection for spoken language understanding," Multimedia Tools and Applications, 2016, 14 pages.

Laflen, A., et al., "Okay, my rant is over: The language of emotion in computer-mediated communication," Computers and Composition, vol. 29, No. 4, 2012, pp. 296308.

Lee, M.K., et al., "Receptionist or Information Kiosk: How Do People Talk With a Robot?," Proceedings of the 2010 ACM conference on Computer supported cooperative work, ACM, 2010, pp. 31-40.

Levy, S., "Alexa, Tell Me Where You're Going Next," Backchannel.com, 2016, 8 pages, available online at https://backchannel.com/alexa-tell-me-where-youre-going-next-739c53ff10b3.

Sarikaya, R., et al., "An overview of end-to-end language understanding and dialog management for personal digital assistants," IEEE Workshop on Spoken Language Technology, 2016, pp. 391-397.

Xu, P., et al., Exploiting Shared Information for Multi-intent Natural Language Sentence Classification, INTERSPEECH, 2013, pp. 3785-3789.

* cited by examiner

DETECTION OF RELATIONAL LANGUAGE IN HUMAN-COMPUTER CONVERSATION

CROSS REFERENCE TO RELATED APPLICATIONS

This application claims the benefit of U.S. Provisional Application No. 62/665,566, filed on May 2, 2018, the entire contents of which are incorporated herein by reference.

FIELD

This disclosure relates to intelligent virtual assistants and configurations of computerized equipment that enhance a user experience during computerized conversations.

BACKGROUND

To better assist humans, Intelligent Virtual Assistant (IVA) designers strive to support human-like interactions. Take, for example, Amazon's Alexa Prize competition where student developers attempt to build IVAs that can carry on meaningful, coherent, and engaging conversations for 20 minutes [1]. As IVAs become more human-like, we theorize that users will increasingly use relational strategies (e.g. self-exposure and justification) with IVAs similar to conversing with humans. There is a large body of work on development of trust between humans engaged in virtual dialog [2, 3, 4, 5]. The focus of these works is on how relational strategies contribute to trust between human speakers. From this literature, we can predict the types of strategies humans may employ with IVAs as they relate to them in an increasingly human manner. In customer service and personal assistant domains, trust is necessary between the human agent and customer. The customer's issues must be viewed by the agent as legitimate for proper attention to be given. Likewise, customers must trust that the agent is capable of assisting them and will not mistreat their information. Current research shows that human-like virtual agents are associated with not only greater user trust but also trust resilience when the agent makes mistakes [6]. To build trust with the agent, customers may establish credibility through small talk, self-exposure, and by providing justification of their requests [7].

In interactive question answering, such as dialogs with an IVA, understanding user intention or intent is essential for the success of the IVA [8]. The intent can be determined as the interpretation of a user input that allows an agent to formulate the best response. However, when relational strategies are applied to IVAs, the additional language introduced is often unnecessary and can even obfuscate user intent. Such language can lead to confusion in the IVA and a degradation of user experience in the form of clarification questions and wrong information. A need continues to exist in the art of intelligent virtual assistants for ways to assess the relevance of portions of a user's input before using computerized methodologies to generate the virtual assistant output. By using only relevant portions of the input from a user, unnecessary background information that may be submitted by the user could be ignored.

SUMMARY

This document describes, in part, techniques for providing virtual assistants that intelligently emulate a representative of a service provider by providing responses to user queries received via the virtual assistants. As described below, these techniques may take the context of a user's query into account both when identifying an intent of a user's query and, thereafter, when identifying an appropriate response to the user's query.

In one example, a virtual assistant is displayed on or adjacent to a site of a service provider for receiving a query from a user. In response to receiving a query, the techniques parse the query to identify one or more concepts expressed therein, while also identifying a context associated with the query. The techniques then map these concepts and the identified context to one of multiple different intents.

The techniques may then map this intent to a response to provide to the user, with this response being based at least in part on the context. After identifying the response with reference to the context, the techniques provide the response to the user at least partly via the virtual assistant.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

DETAILED DESCRIPTION

Figure 1:
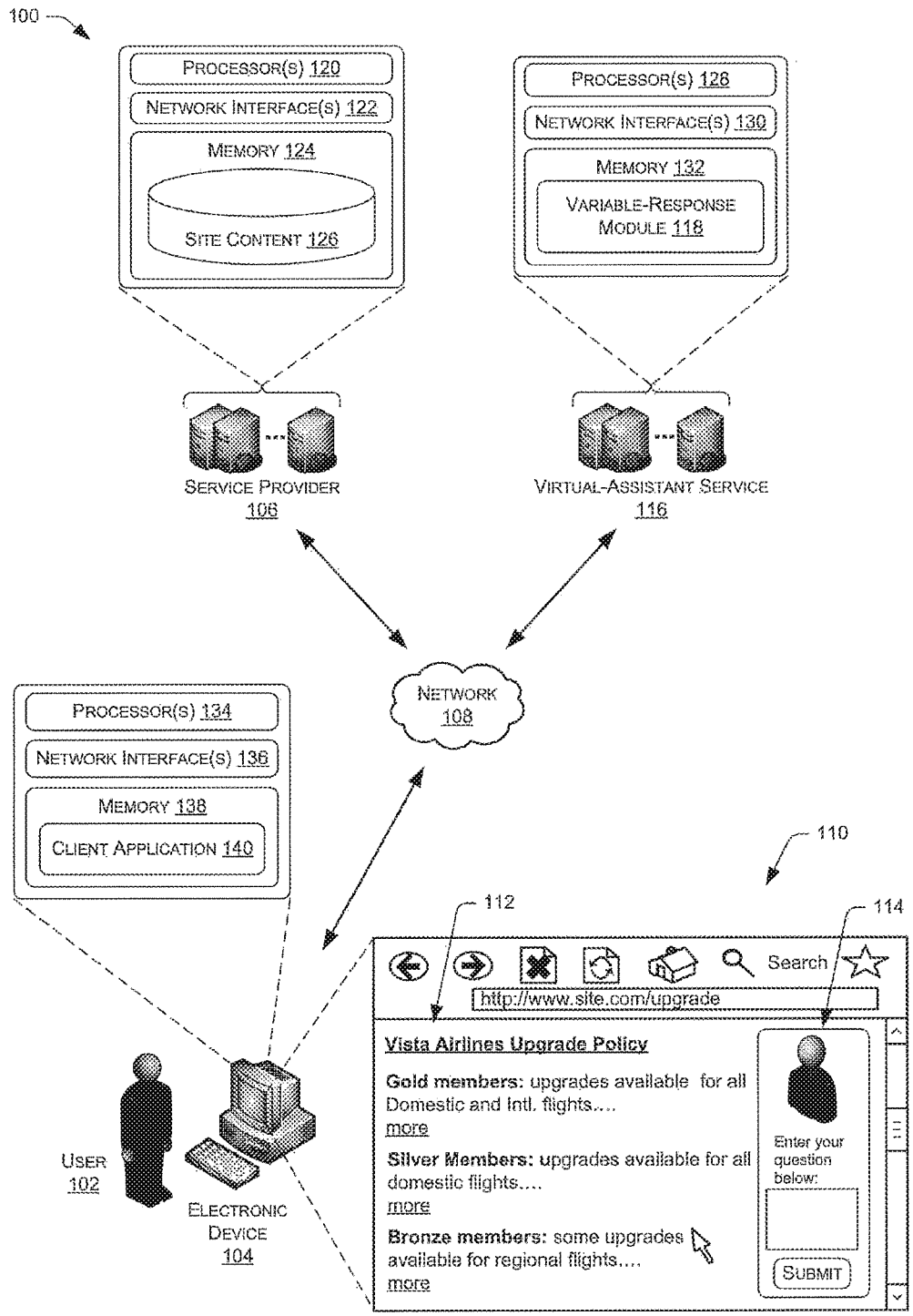
FIG. 1 illustrates an example architecture that includes a user operating an electronic device to render content from a site of a service provider (e.g., a website, a client application, etc.). The architecture also includes a virtual-assistant service that provides a virtual assistant for rendering on or adjacent to the site of the service provider, with this virtual assistant configured to provide variable responses to user queries. These responses may be determined, in part, by mapping a query to an intent based on a context of the query and by mapping the intent to a response, again with reference to the context of the query.

The detailed description is set forth with reference to the accompanying figures. In the figures, the left-most digit(s) of a reference number identifies the figure in which the reference number first appears. The use of the same reference numbers in different figures indicates similar or identical items or features.

Natural language input data described herein may take any form sufficient to be converted into a computer or software based machine language for processing. As such, the inputs to an intelligent virtual assistant may include written, typed, oral, audio, gestures, or any communication form.

In order to identify a variable response (or "reply") to a particular user query, the techniques may take into account a context associated with a query in two different locations. First, the techniques may take into account the context associated with a query when determining the intent or meaning of the user's query. In addition, after identifying the user's intent with use of the context, the techniques may again take this context into account when determining a response or reply to provide back to the user. In some instances, the techniques take the same pieces of context into account when identifying the intent and the response, while in other instances the techniques may take into account different pieces of context. By taking context into account in both locations, the techniques are able to provide responses that more closely emulate human-to-human conversation than when compared to traditional techniques for identifying virtual-assistant responses.

To illustrate, a user may navigate to a site of a service provider that includes a virtual assistant, either on the site or adjacent to the site. The virtual assistant may include an avatar that resembles a human representative of the service provider (e.g., that represents a human face). In addition, the virtual assistant may include an input mechanism, such as a text box, in which a user may input a query. In some instances, the user may type the query, while in other instances the user may issue the query audibly or in any other manner. In either case, the query may comprise a question (e.g., "Can I upgrade my seat assignment on my next flight?") or may simply comprise one or more keywords or a phrase (e.g., "seat assignment upgrades").

In response to receiving the query, the techniques parse the query and utilize natural language processing techniques to identify one or more concepts expressed therein. In one example, the concepts may be based at least in part on keywords within the query, although the concepts may additionally be determined using a richer process as discussed below. In one basic example, these concepts may comprise keywords, such as "upgrade," "seat assignment", "flight", and the like in this example. After identifying the concept(s) expressed in the query, the techniques may identify a context associated with the query. The context associated with the query may include a context associated with the user, a context associated with the user's session on the site of the service provider or the like. In some instances, a context is expressed as a value of one or more variables, such as whether or not a user has signed in with a site (e.g., "is_signed=m=true" or "is_signed=m=false"). A context associated with the query may comprise a value associated with any type of variable that aids in understanding the meaning of a particular query provided by the user. Example, non-limiting pieces of context may include:

whether or not the user has signed in with the site of the service provider (e.g., with a user name and password);

a status of the user with the service provider (e.g., based on miles flown, a type of membership of the user, a type of subscription purchased by the user);

a page of the site from which the user provides the query to the virtual assistant;

how long the user has remained on the page of the site from which the user provides the query to the virtual assistant;

a navigation history of the user during the session prior to the user providing the query to the virtual assistant;

a location of a cursor on the site when the user provides the query to the virtual assistant;

a prior query provided by the user to the virtual assistant during the session or a prior session;

a time of day at which the user provides the query to the virtual assistant;

a date on which the user provides the query to the virtual assistant; [0031] an age of the user;

a location of the user (e.g., a geolocation of the user indicated by the device on which the user provides the query);

a device type from which the user accesses the site (e.g., a mobile device, a desktop computer, etc.);

a language associated with the user (e.g., a language of the query submitted by the user);

how the user interacts with the virtual assistant (e.g., whether the user submits a query textually, using voice input, etc.);

how the interaction with the virtual assistant is initiated (e.g., via user selection of a link or graphic, via the virtual assistant proactively engaging the user, etc.);

past interaction information between the user and the virtual assistant, either during the current session or during previous sessions (e.g., previous queries and responses, etc.)

how the user has been communicating recently (e.g., via text messaging, via email, etc.);

information derived from the user's location (e.g., current, forecasted, or past weather at the location, major sports teams at the location, nearby restaurants, etc.);

current topics of interest, either to the user or generally (e.g., trending microblog or blog topics, current news, recent microblog or blog posts made by the user, etc.).

After identifying one or more pieces of context, such as one or more of those pieces of context listed above, the techniques may map the combination of: (1) the identified concept(s), and (2) the identified piece(s) of context to one of multiple different intents, each of which represents techniques' best guess as to what exactly the user is asking about.

For instance, if a user provides a query stating "what are your store hours?" and the user is determined to be within one block of a brick-and-mortar location of the service provider, then the techniques may determine that the user's intent is to determine whether or not the store is open for the user to enter at this moment. If, however, the user provides a query of "general store hours" and the user is determined to be in a different city as a brick-and-mortar location of the service provider, then the techniques may determine that the user's intent is to learn about the general store hours throughout the week rather than whether or not the store is open at the instant that the user provides the query. In this example, the techniques may map the received queries to two different intents even though the identified concept (store hours) is the same or very similar.

After mapping the user's query to one of multiple different intents based on both the identified concepts and the context associated with the query, the techniques may then map the intent to one of multiple different responses associated with the intent. Returning to the example of the user within one block of a merchant providing the query "what are your store hours?", recall that the techniques have already mapped this query and surrounding context (e.g., location) to an intent indicating that the user is trying to determine whether or not she is able to enter the store at the instant time. Thereafter, the techniques may take into account the same or a different context of the query when identifying a response to provide to the user.

For instance, envision that the user issues this query at 8:50 pm and the store closes at 9:00 pm. Based on this context and the previously determined intent, the techniques the may provide a response to the user stating "We close in ten minutes! Hurry and come see us!" If, however, the user issues the query at 9:05 pm, then the techniques may provide a response stating "We just missed you! However, we are open tomorrow from 8 am to 9 pm."

In another example, a user's may provide an initial query asking "may I upgrade my seat assignment on my next flight?" In response, the techniques may first map the query to an intent (based on context) and then again reference one or more pieces of context prior to determining a response to the query. For instance, envision that the techniques determine that the value of the variable "is_signed_in" is true and that the value of the variable "Gold_Customer" is also true, meaning that the user is in fact signed in with the service provider and is a "gold customer" at the service provider. In this example, the intent coupled with this context may map to a particular response, which may indicate that the all gold members are entitled to available upgrades. If, however, the value of the variable "Gold_Customer" is false but the value of the variable "Silver_Customer" is true, then the intent coupled with this different context may map to a response indicating that silver customers are entitled to upgrades in certain circumstances.

Furthermore, the techniques could take into account additional context when sending the response, such as a time that the query is received and a time of the user's next flight. If these times indicate that the user's flight is about to take off, then the techniques could use this context to switch the communication channel between the user and virtual assistant. For instance, if the user submits the query via a web interface, but techniques determine that the user's flight is about to take off, then the techniques may send the response via a text message in addition or in the alternative to providing the response via the web interface. The techniques may also take into account past interactions between the user and the virtual assistant, communication channels the user regularly uses, communication channels the user has recently been using, and the like.

As described in detail below, a response provided back to a user may include content and/or action(s). For instance, a response may include content such as a textual answer or information, an audible answer or information, one or more hyperlinks to pages that have been determined to be related to the query, or the like. In some instances, the techniques may provide some or all of this response via the virtual assistant. For instance, the returned content may include text and one or more links that are written as a narrative from the perspective of the virtual assistant. This content may also be addressed to or otherwise tailored to the particular user, if recognized (e.g., "Yes, John, as a Gold Customer you are entitled to a seat upgrade, and I have provided some links below that may be of interest to you . . . ."). In addition or in the alternative, the techniques may provide information audibly that appears to originate from the virtual assistant.

Addition or alternatively, the techniques may perform an action on behalf of the user in response to receiving the query, such as causing a user's electronic device to navigate to a page deemed related to the query (e.g., to a page associated with Gold Customer upgrade policies), may alter a reservation or order on behalf of the user (e.g., upgrade the user's seat assignment), may initiate a request on behalf of the user (e.g., request the upgrade), may initiate a communication on behalf of the user, may purchase an item on behalf of the user, or may perform any other similar or different type of action in response to receiving the query.

By taking into account the context of a query both: (1) for the purposes of identifying an intent, and (2) after for the purposes of identifying a response identifying the intent, the techniques described herein allow for interaction between virtual assistants and end users that more closely mirror human-to-human interactions. These techniques are described below with reference to an example architecture. It is to be appreciated, however, that other similar and/or different architectures may also implement these techniques.

Example Architecture

FIG. 1 illustrates an example architecture 100 that includes a user 102 operating an electronic device 104 to render content from a site of a service provider 106. The site may comprise a website, an intranet site, a downloaded application, or any other platform on which the user 102 may access information from the service provider 106. In this example, the user 102 access the site over a network 108, which may represent any type of communication network, including a local-area network, a wide-area network, the Internet, a wireless network, a wireless wide-area network (WWAN), a cable television network, a telephone network, a cellular communications network, combinations of the foregoing, and/or the like.

As illustrated, the device 104 renders a user interface (UI) 110 that includes content 112 from the service provider 106 and content 114 from a virtual-assistant service 116. In some instances, the content 114 may be served from servers of the service provider 106 as part of the site, while in other instances the content 114 may be from servers of the virtual-assistant service 116 served atop or adjacent to the site. In either instance, the content 112 of the site may include any sort of details or information associated with the service provider 106, while the content 114 may include a virtual assistant (e.g., an avatar that resembles a human representative of the service provider 106) along with an interface that allows the user 102 to enter a query to the virtual assistant.

As described in further detail below, the user 102 may enter a query into the interface provided by the virtual assistant. In response to receiving this query either from the computing device 104, from the service provider 106, or in some other manner, a variable-response module 118 of the virtual-assistant service 116 may identify a response to provide to the user 102 at least partly via the virtual assistant. For instance, the variable-response module 118 may map the query to an intent based on a context of the query and may then map the intent to a response, again with reference to the context of the query. After identifying the response, the virtual-assistant service 116 and/or the service provider 106 may provide the response to the user 102.

As illustrated, the service provider 106 may comprise one or more computing devices (e.g., one or more servers) that include or otherwise have access to one or more processors 120, one or more network interfaces 122, and memory 124, which stores content 126 of the site of the service provider 106. The virtual-assistant service 116, meanwhile, may also comprise one or more computing devices (e.g., one or more servers) that include or otherwise have access to one or more processors 128, one or more network interfaces 130, and memory 132, which stores the variable-response module 118.

Finally, the electronic device 104 of the user 102 may include or otherwise have access to one or more processors 134, one or more network interfaces 136, and memory 138, which stores a client application 140 for rendering the UI 110. The client application may comprise a browser for rendering the site content 126, a downloaded application provided by the service provider 106, or any other client application configured to output content from the service provider 106. While FIG. 1 illustrates the service provider 106 storing the site content 126, in some instances the client application 140 may store some or all of this content locally on the device 104.

Furthermore, while FIG. 1 illustrates the electronic device 104 as a desktop computer, the electronic device 104 may comprise any sort of device, such as a mobile phone, a multifunctional device, a laptop computer, a personal digital assistant (PDA), or the like. In each instance, the electronic device 104 may include various additional components, such as one or more output devices (e.g., displays, speakers, etc.), one or more input devices (e.g., a keyboard, a touch-screen, etc.), an operating system, system busses, and the like.

The memory 138 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

While FIG. 1 illustrates one example architecture for providing variable responses, it is to be appreciated that multiple other architectures may implement the described techniques. For instance, while FIG. 1 illustrates the service provider 106 as separate from the virtual-assistant service 116, in some instances some or all of these components may reside in a common location, spread out amongst multiple additional entities, located on the electronic device 104, and/or the like.

Example Variable Responses

Figure 2A:
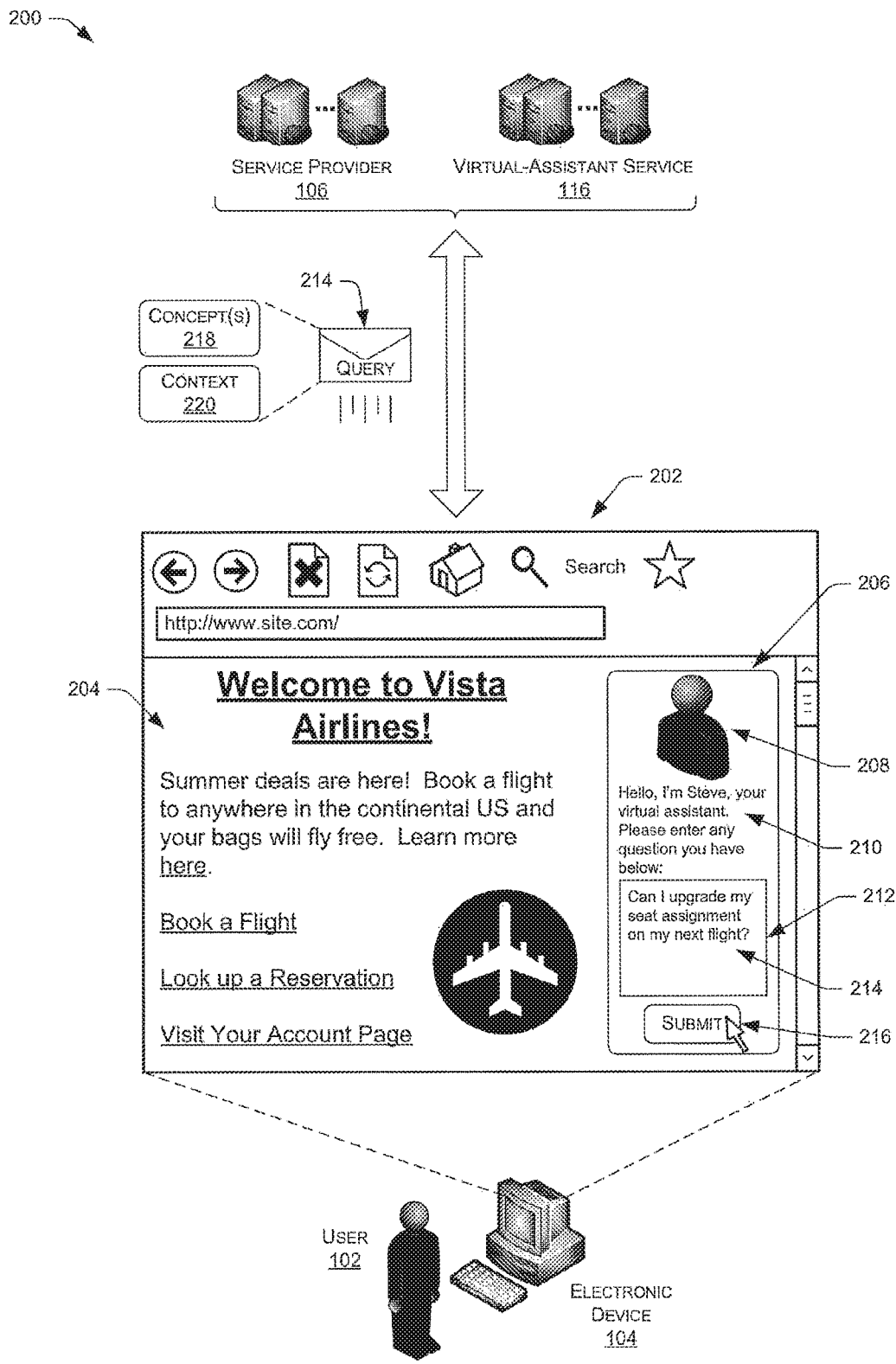
FIG. 2A illustrates a high-level communication flow between an electronic device of the user and the service provider and/or the virtual-assistant service. Here, a user provides a query via the virtual assistant.
Figure 2B:
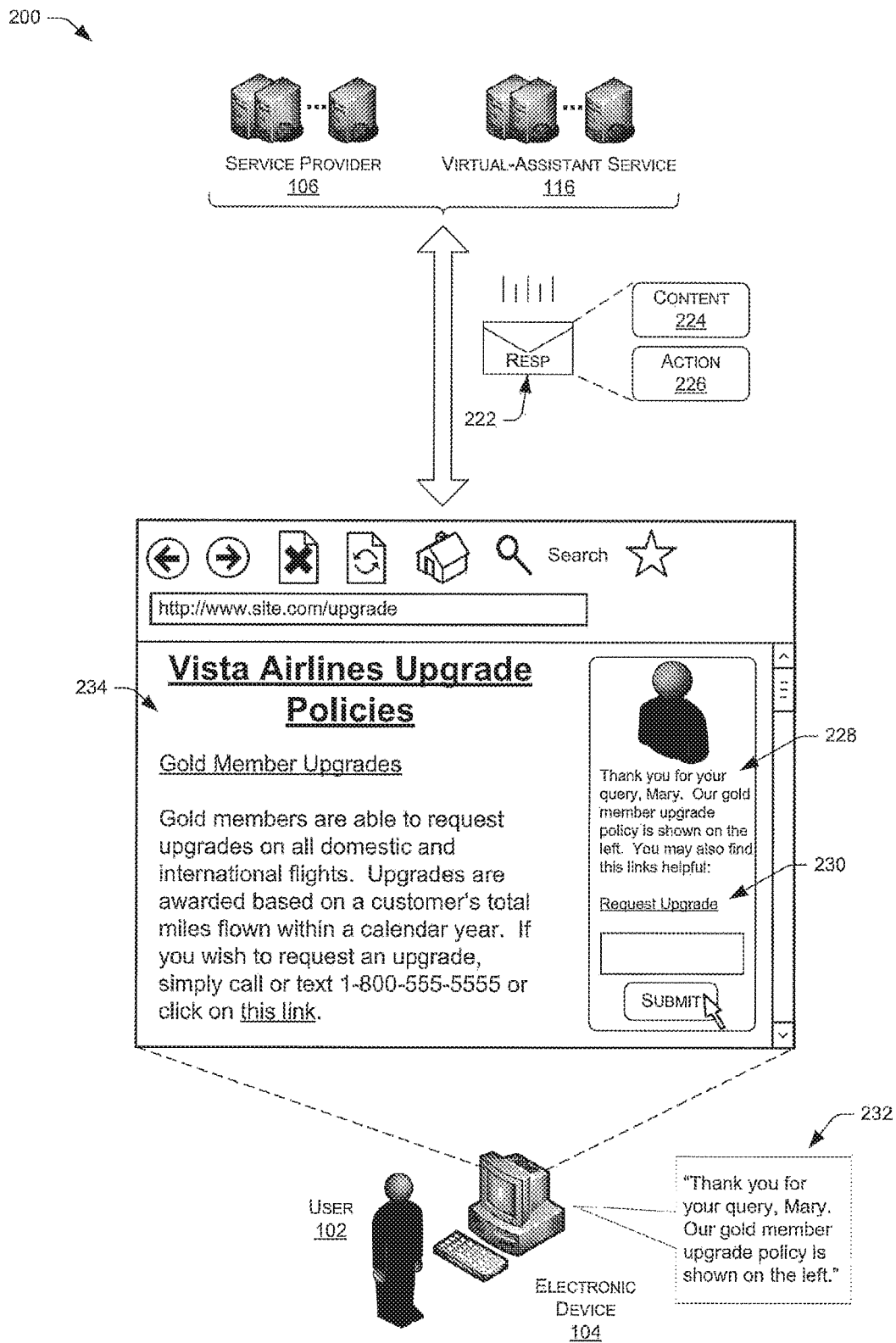
FIG. 2B illustrates a high-level communication flow between an electronic device of the user and the service provider and/or the virtual-assistant service. Here, the service provider and/or the virtual-assistant service provides a variable response for output on the electronic device of the user.

FIGS. 2A-B collectively illustrate a high-level communication flow 200 between the example electronic device 104 of the user 102 and the service provider 106 and/or the virtual-assistant service 116. As illustrated, the electronic device 104 renders a user interface (UI) 202 that includes content 204 from the service provider 106 and content 206 from the virtual-assistant service 116. In some instances, the virtual-assistant service 116 serves the content 206 to the device 104, while in other instances the service provider 106 serves the content 206, either as part of the site content 204 or after receiving the content from a separate virtual-assistant service 116.

In either instance, the example content 204 here represents a home page of an example service provider ("Vista Airlines"). The content includes a title of the page, a link to current promotions, a link to book a flight, and the like. The content 206, meanwhile, collectively comprises a virtual assistant that is configured to emulate human-to-human interaction between the example user 102 and the service provider 106. In this example, the content 206 includes an avatar 208 that depicts a human representative of the service provider, as well as text 210 introducing the avatar 208 as a virtual assistant ("Hello, I'm Steve your virtual assistant. Please enter any question you have below:").

The content 206 also includes an input mechanism, here in the form of a text box 212, in which the user 102 is able to enter a query to the virtual assistant. In this example, the user 102 has entered the query in the form of a string of text 214 ("Can I upgrade my seat assignment on my next flight?"). The user 102 may enter this query via a keyboard, audibly, or in any other manner Finally, the example content 206 includes an icon 216 ("Submit") that, when selected, allows the user 102 to submit the query to the service provider 106 and/or the virtual-assistant service 116.

As illustrated, the user 102 has in fact selected the icon 216 to submit the entered query to the provider 106 and/or the service 116. In some instances, the device 104 provides the query 214 directly to the service provider 106, which identifies an appropriate response and may provide this response back to the device 104 or to another device associated with the user. In other instances, meanwhile, the provider 106 may receive the query 214, provide the query 214 to the service 116, receive a response from the service 116, and provide the response to the device 104 or to another device associated with the user. In still other instances, the device 104 provides the query 214 to the service 116 directly, which may identify a response or provide the query 214 to the provider 106 for identifying a response. The service 116 or the provider 106 may then provide the response to the device 104 or to another device associated with the user. Of course, while a few example communication flows have been described, it is to be appreciated that other communication flows are possible.

In each instance, the query 214 sent to the provider 106 and/or the service 116 may comprise one or more concepts 218 and one or more pieces of context 220. The concepts 218 may be based, in part, on the words and phrases within the string of text entered by the user, while the context 220 may be based on any additional factors associated with the user, the device 104, or the like. As described above, for instance, the context 220 may include whether or not the user is signed in with the service provider 106, a status of the user 102 with the service provider, an age of the user 102, a type of device from which the user 102 provides the query 214, or the like.

FIG. 2B continues the illustration and represents the service provider 106 and/or the virtual-assistant service 116 providing a response 222 for output on the electronic device 104 or on another electronic device associated with the user 102. As described above and in further detail below, the provider 106 and/or the service 116 may have identified the response by first mapping the concepts 218 and the context 220 to an intent, and thereafter mapping the intent and the context 220 to the response 222. As illustrated, the response 222 may comprise content 224, one or more actions 226 to perform, or a combination thereof.

FIG. 2B, for instance, illustrates that the response 222 includes text 228, a hyperlink 230, and audio content 232. The text 228 may comprise an answer or information otherwise pertaining to the user's query 214. Here, for example, the text 228 states the following: "Thank you for your query, Mary. Our gold member upgrade policy is shown on the left. You may also find this link helpful:". As such, the provider 106 and/or the service 116 may have determined, via the context 220, that the user 102 was in fact signed with the service provider 106 when the user 102 submitted the query 214 and that the user 102 ("Mary") has a status of "gold member" with the service provider 106.

In addition, the response 222 included the link (e.g., a hyperlink) 230 associated with the query and entitled "Request Upgrade". When the user 102 selects the link 230, the electronic device 104 may navigate to a page at which the user 102 may request to upgrade her seat on her next flight. The audio content 232, meanwhile, may comprise the same content as the text 228, or may comprise different content in other examples. In some instances, the avatar (i.e., the visual representation of the virtual assistant) may appear to utter the audible content 232, either based on the tone of the content 232 and/or based on the avatar appearing to speak the words within the content 232.

In addition, the response 222 may include one or more actions 226 for performance on behalf of the user 102. Here, for instance, the response 222 has instructed the device 104 to navigate to a new page 234 of the site of the content provider, with this page being associated with the query 214. In this example, the page 234 indicates the service provider's policy for upgrading gold members, like the user 102. In other instances, the action 226 may comprise automatically upgrading the user's seat assignment, initiating a request to upgrade, or the like.

Figure 3A:
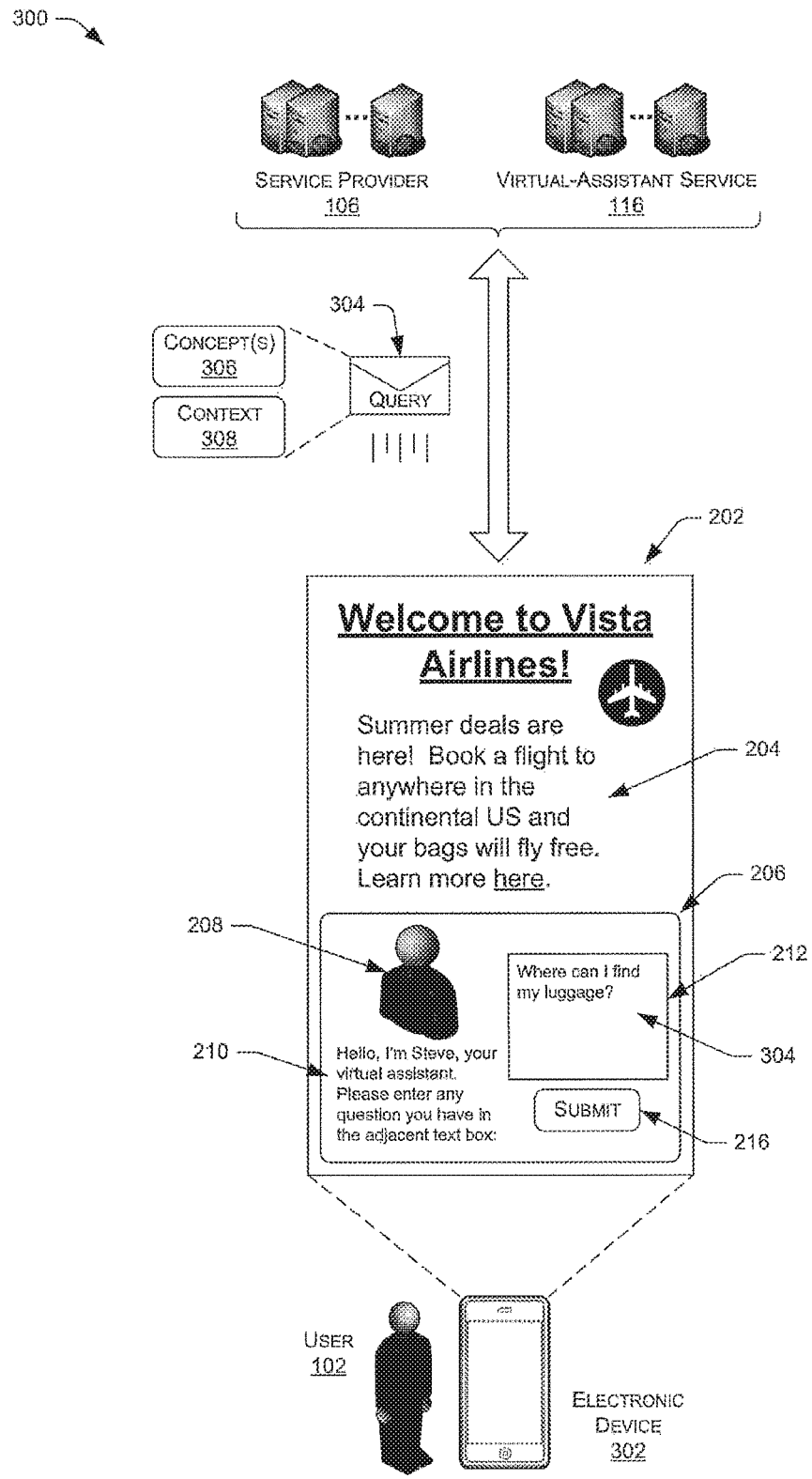
FIG. 3A illustrates another high-level communication flow between a mobile electronic device of the user and the service provider and/or the virtual-assistant service. Here, the user again provides a query via the virtual assistant.
Figure 3B:
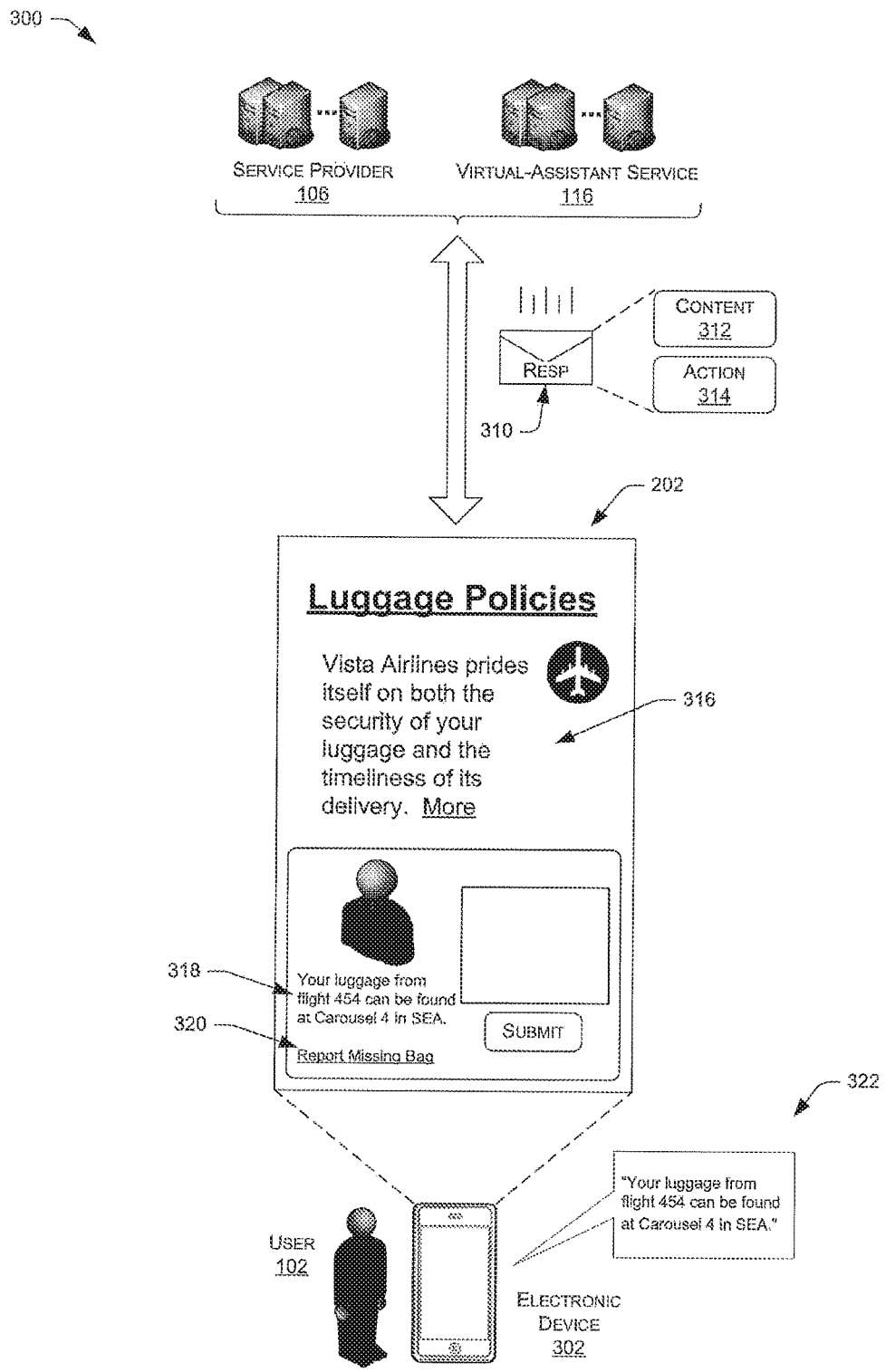
FIG. 3B illustrates another high-level communication flow between a mobile electronic device of the user and the service provider and/or the virtual-assistant service. Here, the service provider and/or the virtual-assistant service provides a variable response for output on the electronic device of the user.

FIGS. 3A-B collectively illustrate another high-level communication flow 300 between a mobile electronic device 302 of the user 102 and the service provider 106 and/or the virtual-assistant service 116. Here, the user 102 again provides a query 304 via the virtual assistant, with the query including one or more concepts 306 and one or more pieces of context 308. In this example, the query comprises the string of text "Where can I find my luggage?". For instance, the user 102 may have recently deplaned from a flight on Vista airlines and, hence, may be providing the query 304 to the provider 106 and/or the service 116 while physically located near a particular airport. In another example, the user may be making this request from her home and prior to actually making the flight. In either instance, the query 304 may include this context in the form of the geolocation of the mobile electronic device 302 when the user issued the query. This geolocation may be provided explicitly by the device 302 (e.g., via GPS coordinates, etc.), may be determined via signal triangulation, or may be determined in any other manner.

FIG. 3B illustrates that, upon receiving the query 304, the service provider 106 and/or the virtual-assistant service 116 may identify a response 310 to provide to the user 102. Again, this response may be determined by identifying an intent of the query 304 with reference to the concepts 306 and one or more pieces of the context 308, and then by mapping the determined intent along with one or more same or different pieces of the context 308 to the response 310.

As with the example of FIGS. 2A-B above, the response 310 may comprise content 312 and/or action 314. In this example, the action 314 includes navigating the user's electronic device 302 to a page 316 of the service provider's site that indicates Vista Airlines' luggage policies. The content 312, meanwhile, includes text 318 indicating that the luggage of the user 102 can be found at carousel four at the airport at which the user 102 landed (SEA). To make this determination, the provider 106 and/or the service 116 may have identified the user 102, her now-completed travel plans, her geolocation, and/or one or more other pieces of context prior to serving the text 318 for output on the device 302. If the user were to have issued the query from her home and prior to her flight, the provider 106 and/or the service 116 may have taken this different context (e.g., a different geolocation, a different time of the query, etc.) into account and may have served different content.

In this example, the content 312 of the response 310 also includes a hyperlink 320 ("Report a Missing Bag") that is related to the query 304 of the user 102. Finally, in this example, the content 312 also includes audible content 322 for output by the virtual assistant. Again, while this audible content 322 is the same as the text 318 in this example, in other examples these pieces of content differ from one another.

Example Virtual-Assistant Service

Figure 4A:
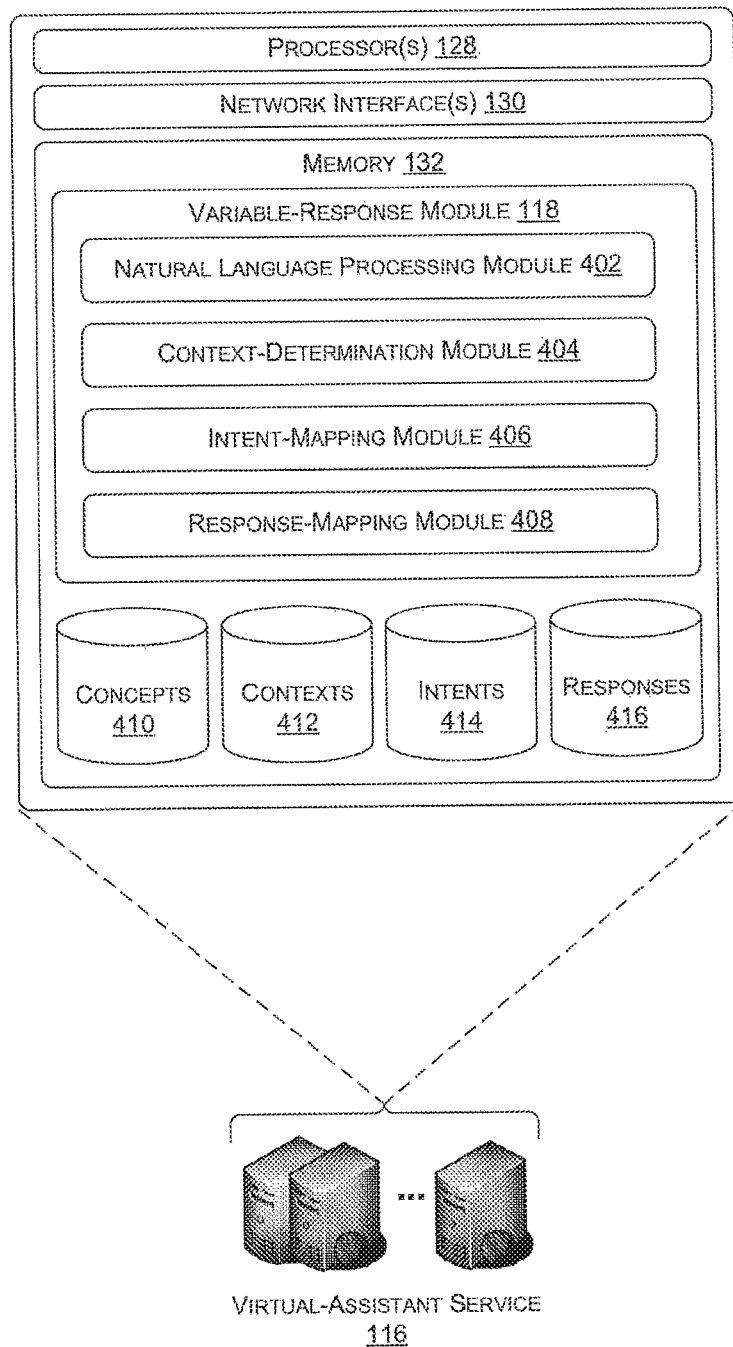
FIG. 4A illustrates example components that the virtual-assistant service of FIG. 1 may utilize when identifying a variable response to provide to a user query.
Figure 4B:
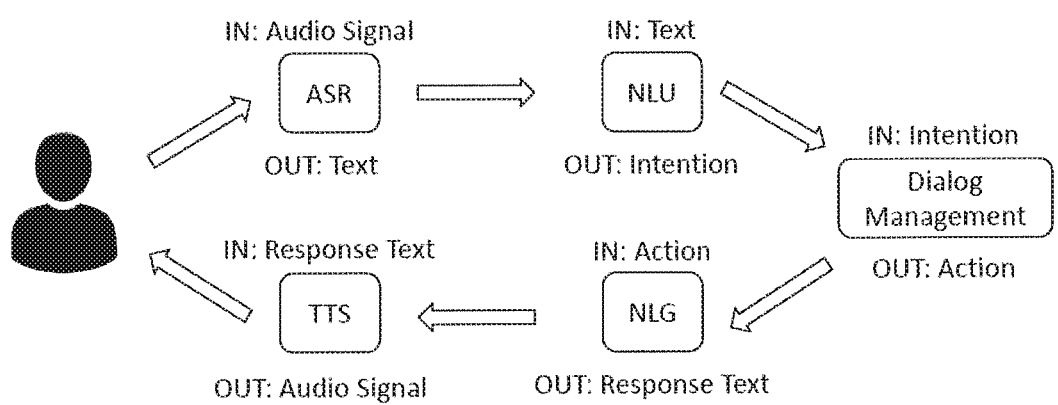
FIG. 4B is a schematic illustration of example data flow paths that the virtual-assistant service of FIG. 1 may utilize when identifying a variable response to provide to a user query.

FIG. 4 illustrates example components that the virtual-assistant service 116 may utilize when identifying a variable response to provide to a user's query. As illustrated, the service 116 may be hosted on one or more servers that include one or more processors 128, one or more network interfaces 130, and memory 132.

The memory 132 may store or otherwise have access to the variable-response module 118, which may include a natural language processing module 402, a context-determination module 404, an intent-mapping module 406, and a response-mapping module 408. In addition, the memory 132 may also store or otherwise have access to a datastore of one or more concepts 410, a datastore of one or more contexts 412, a datastore of one or more intents 414, and a datastore of one or more responses 416.

The natural language processing module 402 may implement known or new natural language processing techniques to parse a received query for the purpose of identifying one or more concepts expressed therein. For instance, the module 402 may identify a set of concepts 410 based on the string of text of the query. The context-determination module 404, meanwhile, may function to identify one or more pieces of context associated with the received query, such as whether the user is signed in, a geolocation of the user when issuing the query, or the like. The intent-mapping module 406 may then map the identified set of concepts and the identified pieces of context to one of the multiple different intents 414. That is, given the union of a particular concept set and respective values of one or more variables associated with the context of the query, the module 406 may map the query to a particular intent of the intents 414.

Finally, the response-mapping module 408 may map the intent to a particular response based at least in part on respective values of one or more variables, which may be the same or different variables used when mapping the query to an intent. Stated otherwise, and as illustrated below with reference to FIG. 5, each intent of the intents 414 may be associated with multiple different responses. Therefore, after a particular query has been mapped to a particular intent, the response-mapping module 408 may identify which of the multiple responses associated with the intent to provide to the user who provided the query, with reference to the context of the query.

While FIG. 4 illustrates the described components as residing on the virtual-assistant service 116, in other instances some or all of these components may reside in another location. For instance, these components may reside across the service 116, the service provider 106, the electronic device 104 or 302, or at any other location.

Figure 5:
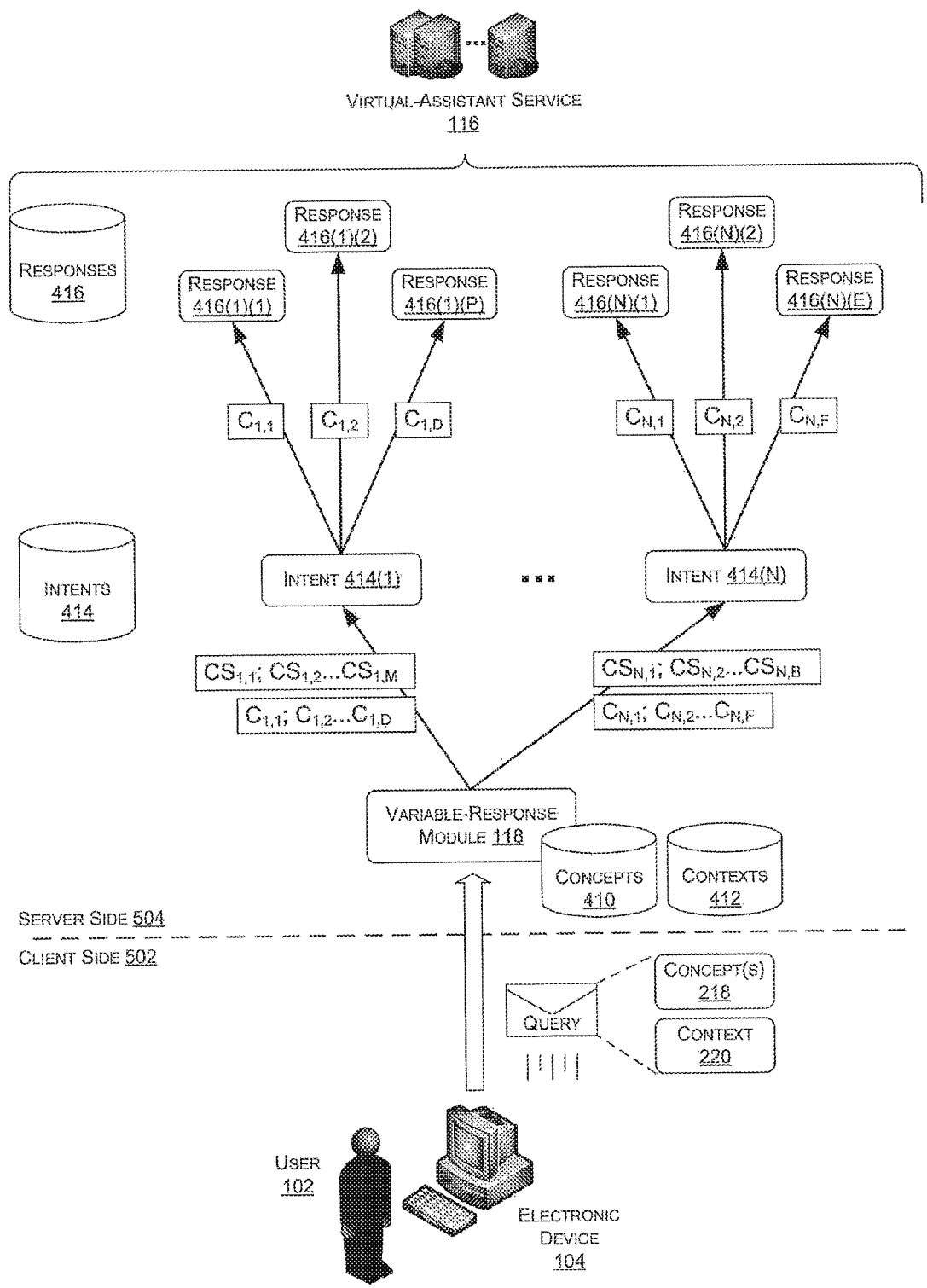
FIG. 5 illustrates how the virtual-assistant service may identify a response to provide to a user in response to receiving a query from the user via a virtual assistant. As illustrated, the service may first map the query to a particular intent with reference to both concepts expressed in the query and a context associated with the query. After mapping the query to an intent, the service may then map the intent to an appropriate response with reference to the context of the query.

FIG. 5 illustrates how the virtual-assistant service 116 may identify a response to provide to the example user 102 in response to receiving a query from the user 102 via a virtual assistant. In this example, the query is provided from the user on a client side 502 of the illustration, while the identifying of a response to provide to the query is illustrated as being performed on a server side 504 of the illustration. Of course, in other implementations different portions of the operations may be performed at other locations.

As FIG. 5 depicts, the example query again includes one or more concepts 218 and one or more pieces of context 220. Upon receiving the query, the variable-response module 118 may identify, potentially with reference to the datastores 410 and 412, the concepts and context of the query. Based on the identified set of concepts of the query (or "concept set") and the identified pieces of context of the query (or "context"), the module 118 may map the query to one of multiple different intents 414(1), . . . , 414(N). For instance, FIG. 5 illustrates that a query having a concept set "CS1,1" and a context "C1,1" maps to the intent 414(1), while a query having a concept set "CSN,1" and a content "C N,1" maps to the intent 414(N). In some instances, a concept set may map to more than one intent and, therefore, the context of the query may be used to determine which intent to map the query to. That is, in instances where a concept set of a query maps to multiple different intents, the intents may compete for the query based on the context of the query. As used herein, a letter (e.g., "N", "E", etc.) represents any integer that is greater than zero.

After mapping the query to an intent, the variable-response module 118 may then map the intent to an appropriate response 416(1)(1), . . . , 416(N)(E) with reference to the context of the query. For instance, for a query that the module 118 has mapped to the intent 414(1) and that has a content "C1,1", the module 118 maps this query to a response 416(1)(1). In some instances, of course, a response may be common (or utilized) across multiple different intents. After identifying the response based on the context, the virtual-assistant service 116 may then provide this response to the user 102, such as directly to the device 104 or to the service provider 106 for providing to the device 104 (and/or to another device associated with the user).

Figure 6A:
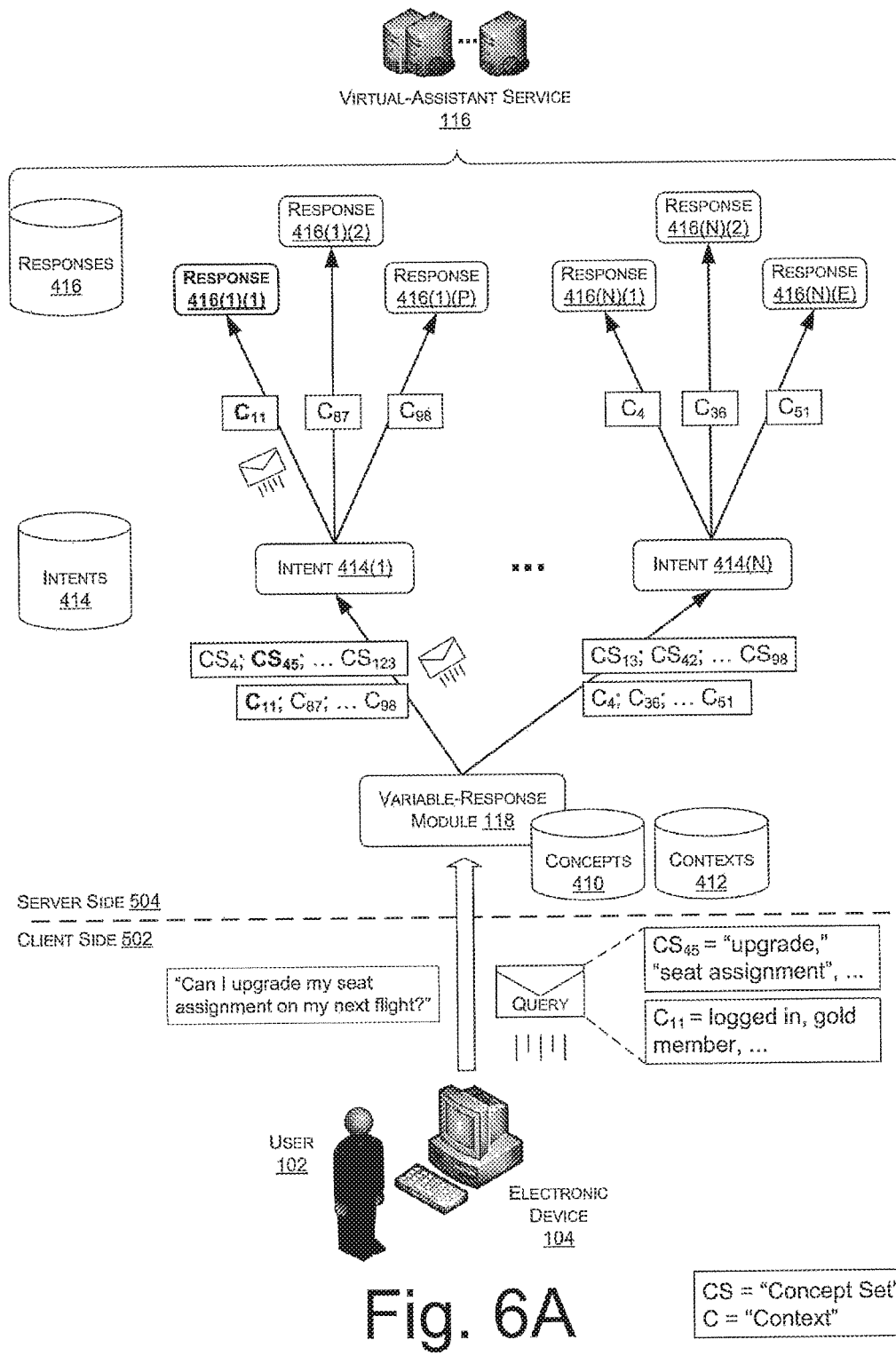
FIG. 6A illustrates an example of mapping a particular query ("Can I upgrade my seat assignment on my next flight?") to a particular response by referencing a context of the query both when mapping the query to an intent and when mapping the intent to a response. As illustrated, the response may include both content (e.g., plain text, links, audio, etc.) and an action (e.g., navigating the user's electronic device to a new page of the site).
Figure 6B:
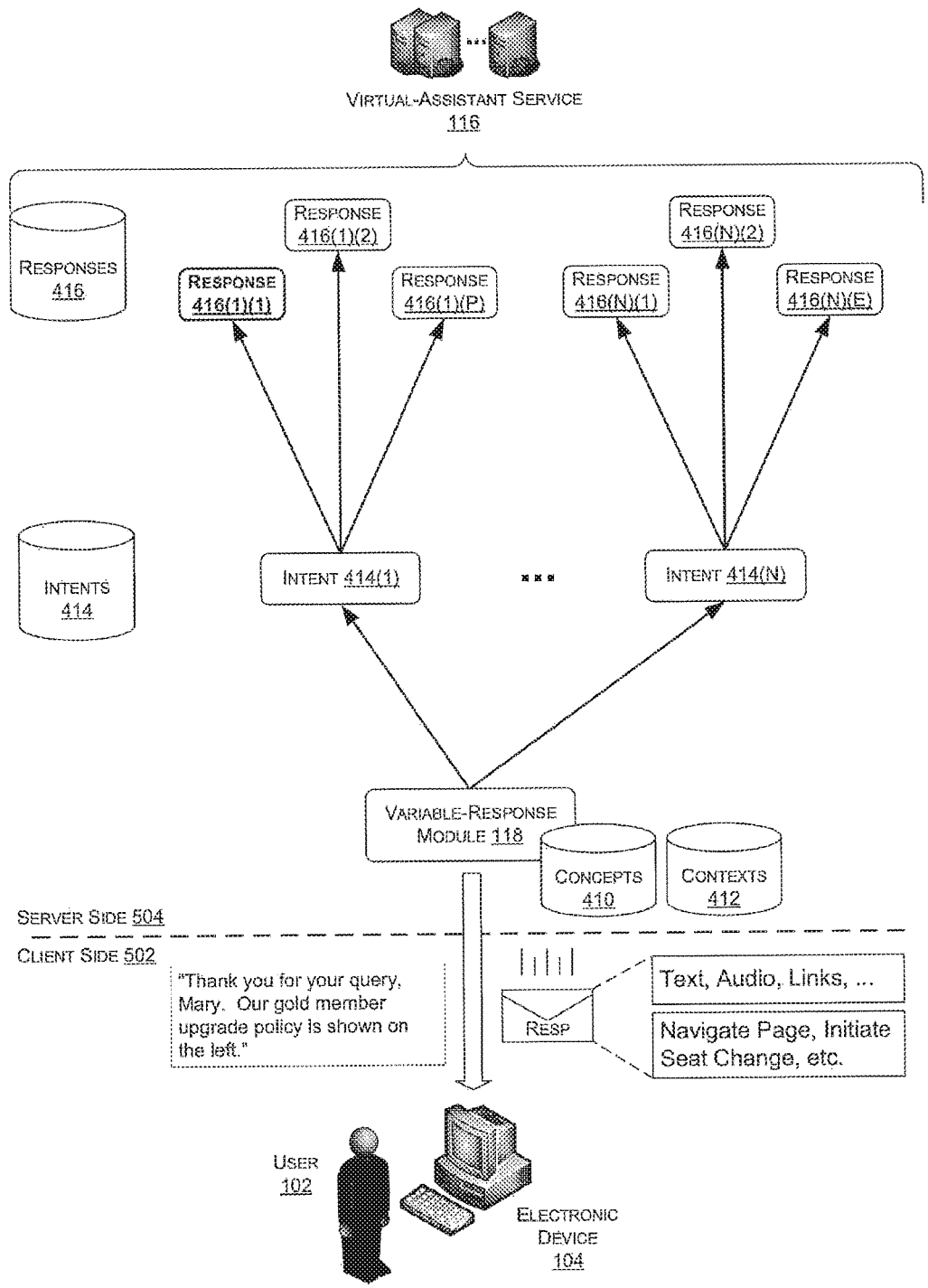
FIG. 6B illustrates an example of mapping a particular query ("Can I upgrade my seat assignment on my next flight?") to a particular response by referencing a context of the query both when mapping the query to an intent and when mapping the intent to a response. As illustrated, the response may include both content (e.g., plain text, links, audio, etc.) and an action (e.g., navigating the user's electronic device to a new page of the site).

FIGS. 6A-B collectively illustrate an example of mapping a particular query ("Can I upgrade my seat assignment on my next flight?") to a particular response by referencing a context of the query both when mapping the query to an intent and when mapping the intent to a response. In this example, the user inputs the query, which comprises a particular concept set ("CS45") and a particular context ("C87"). In response to receiving the query and identifying the concept set and context, the variable-response module 118 has mapped the query to the example intent 414(1). Thereafter, the module 118 has mapped this intent to the example response 416(1)(1) based on the identified context of the query.

FIG. 6B continues the illustration, and represents the virtual-assistant service 116 providing the example response 416(1)(1) to the electronic device 104. As illustrated, the response may include both content (e.g., text, links, audio, etc.) and an action (e.g., navigating the user's electronic device to a new page of the site), as described above with reference to FIG. 2B.

Example Processes

Figure 7A:
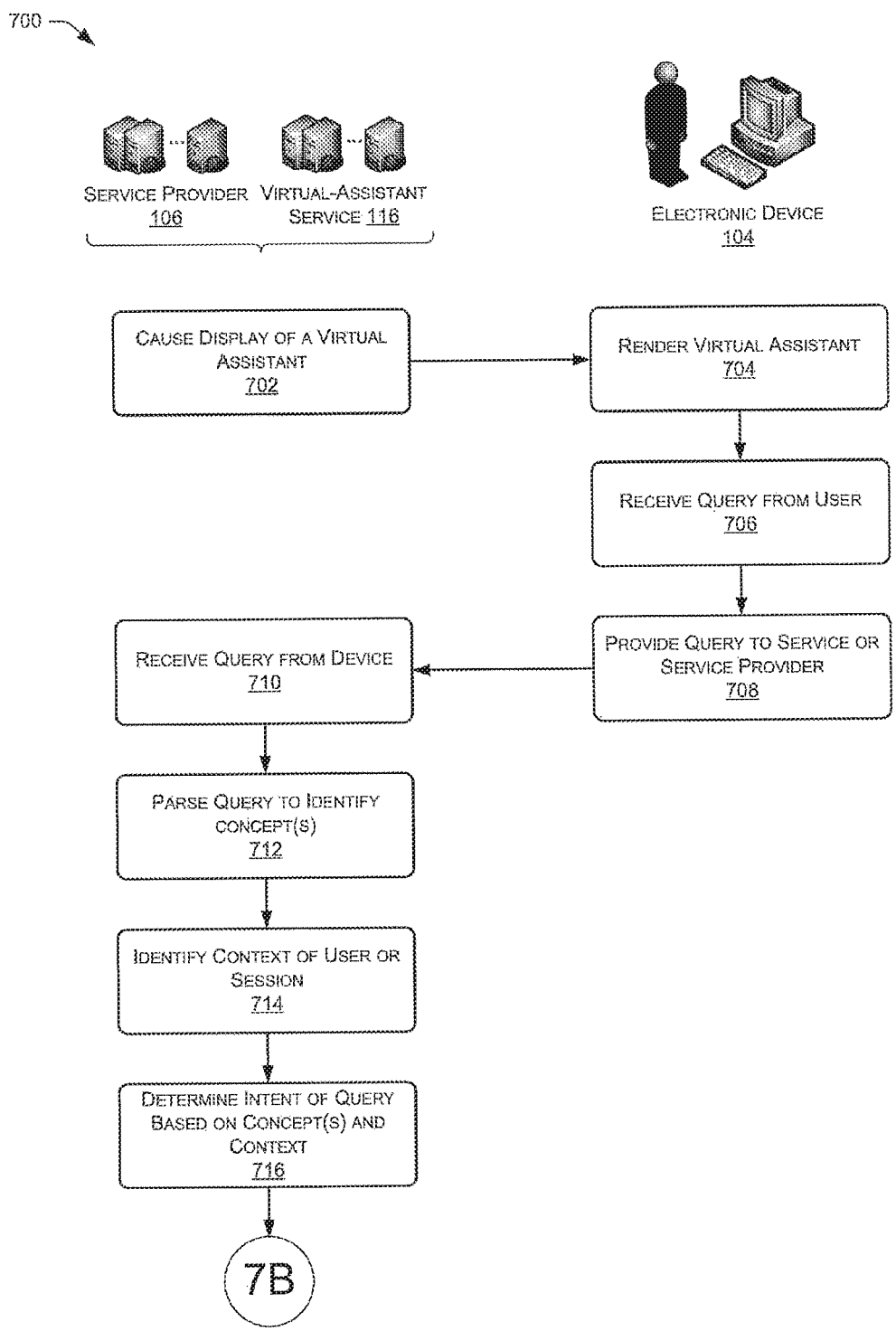
FIG. 7A illustrates an example process that includes a user providing a query via a virtual assistant and the service provider and/or the virtual-assistant service identifying a response to provide to the user. Consistent with the discussion above, this response may take a context of the query into account both when identifying an intent of the query and when identifying an appropriate response.
Figure 7B:
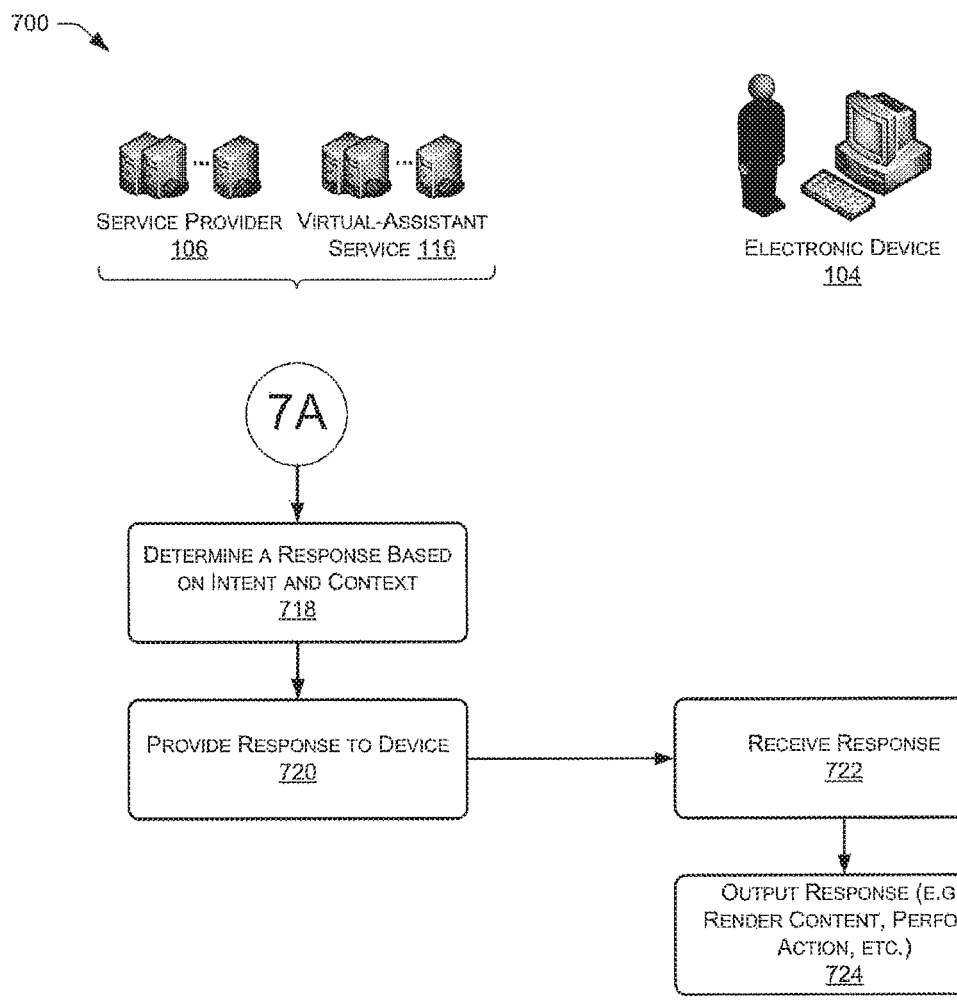
FIG. 7B illustrates an example process that includes a user providing a query via a virtual assistant and the service provider and/or the virtual-assistant service identifying a response to provide to the user. Consistent with the discussion above, this response may take a context of the query into account both when identifying an intent of the query and when identifying an appropriate response.

FIGS. 7A-B collectively illustrate an example process 700 that includes the example user 102 providing a query via a virtual assistant and the service provider 106 and/or the virtual-assistant service 116 identifying a response to provide to the user 102. Consistent with the discussion above, this response may take a context of the query into account both when identifying an intent of the query and when identifying an appropriate response. In this example, operations illustrated beneath the electronic device 104 may be performed by this device in some examples, while operations illustrated beneath the provider 106 and the service 116 may be performed by the provider and/or the service in some examples. However, it is to be appreciated that in other implementations the operations may be performed at any other location(s).

The process 700 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 702, the service provider 106 and/or the virtual-assistant service 116 causes display of a virtual assistant on or adjacent to a site of service provider rendered on a display of the electronic device. At 704, and in response, the device 104 renders the virtual assistant on the display. At 706, the device 104 receives a query from the user, which may comprise a string of text. At 708, the device 104 provides this query to the provider 106 and/or the service 116, which receives the query at 710.

At 712, the provider 106 and/or the service 116 parses the query to identify one or more concepts expressed therein. That is, the provider 106 and/or the service 116 may use natural language processing techniques to identify concepts specified by the user in the query. These concepts may be determined with reference to contents of the user's query in any suitable manner. In some examples, the concept(s) of a query are determined at least partly with reference to one or more keywords expressed within the query. For instance, the concepts may be determined using relatively basic keyword matching in some instances. In other instances, meanwhile, the concepts may be determined using a much richer process as described below.

In these instances, when the provider 106 and/or the service 116 receives the query in the form of a string of text, the provider 106 and/or the service 116 preprocesses the string by, for example, identifying one or more tokens within the string. The tokens may comprise words, phrases, symbols, or the like that signify some sort of meaning within the query. After tokenizing the string of text, the provider 106 and/or the service 116 may then map each of these tokens and/or ordered patterns of the tokens to a more general set, known as a "vocab item". A vocab item may comprise a general set of multiple different tokens having a meaning that is common amongst these tokens. For instance, the tokens "happy", "elated" and a smiley face (e.g., ":-)") may each map to a vocab item representing "happiness".

After mapping tokens and/or patterns of tokens from the original string of text to one or more vocab items, the provider 106 and/or the service 116 may then pattern match the vocab items to one or more concepts. That is, each concept may be associated with multiple different vocab-item patterns (e.g., "(vocab item A, vocab item, D, vocab item F)", "(vocab item B, vocab item E)", "(vocab item X)", etc.). In addition, some of these patterns may be associated with a context. For instance, the pattern "(vocab item B, vocab item E)" may map to a particular concept given a particular context (e.g., the user is a Gold Member), but not otherwise. By pattern matching the vocab items to the concepts, the provider 106 and/or the service 116 may identify one or more concepts that are associated with the submitted query.

In addition or in the alternative to the techniques described above, the provider 106 and/or the service 116 may identify concept(s) of a query with reference to a graph data structure that maintains correlations between words. The graph data structure, for instance, may maintain a hierarchy of words (e.g., hypernyms and hyponyms). The techniques may utilize this hierarchy to identify one or more concepts within a string of text. For instance, if a string contains the word "cookbook", the techniques may analyze the graph data structure to determine that "cookbook" is a type of a "reference book" which is a type of "book". The techniques may then identify "book", "reference book", and/or "book" as a concept within the query. Of course, in this and other processes used to determine concepts within queries, the techniques may reference other factors associated with the queries, such as the ordering of words, parts of speech of words, and the like. Furthermore, while a few different example techniques for identifying concepts have been described, it is to be appreciated that other new and/or known techniques may be used to identify concepts within a query.

At 714, the provider 106 and/or the service 116 may also identify a context associated with the user 102 or with a session of the user 102 on the site of the service provider 106. This may include whether the user is logged in on the site, a page from which the user submitted the query, a status of the user at the service provider 106, or the like. At 716, the provider 106 and/or the service 116 then determines an intent of the query based on the identified concept(s) and the identified context.

FIG. 7B continues the illustration of the process 700 and includes, at 718, the provider 106 and/or the service 116 determining a response to provide to the query based on the intent and the identified context. In some instances, the portion of the context referenced in mapping the query to the intent represents the same portion of context referenced in mapping the intent to the response. In other instances, meanwhile, the provider 106 and/or the service 116 map the query to an intent using a first portion of context, while using a second, different portion of the context when mapping the intent to the response. Of course, in still other instances, these portions of content may include at least one common piece of context and at least one piece of context that is not commonly used.

At 720, the provider 106 and/or the service 116 provides the response to the electronic device 104 of the user or to another electronic device associated with the user. In this example, the device 104 receives the response at 722 and, at 724, outputs the response to the user 102, at least a portion of which may be outputted via the virtual assistant. For instance, the device 104 may render text, one or more links, audible content, and the like, and may perform one or more actions specified in the response.

Figure 8:
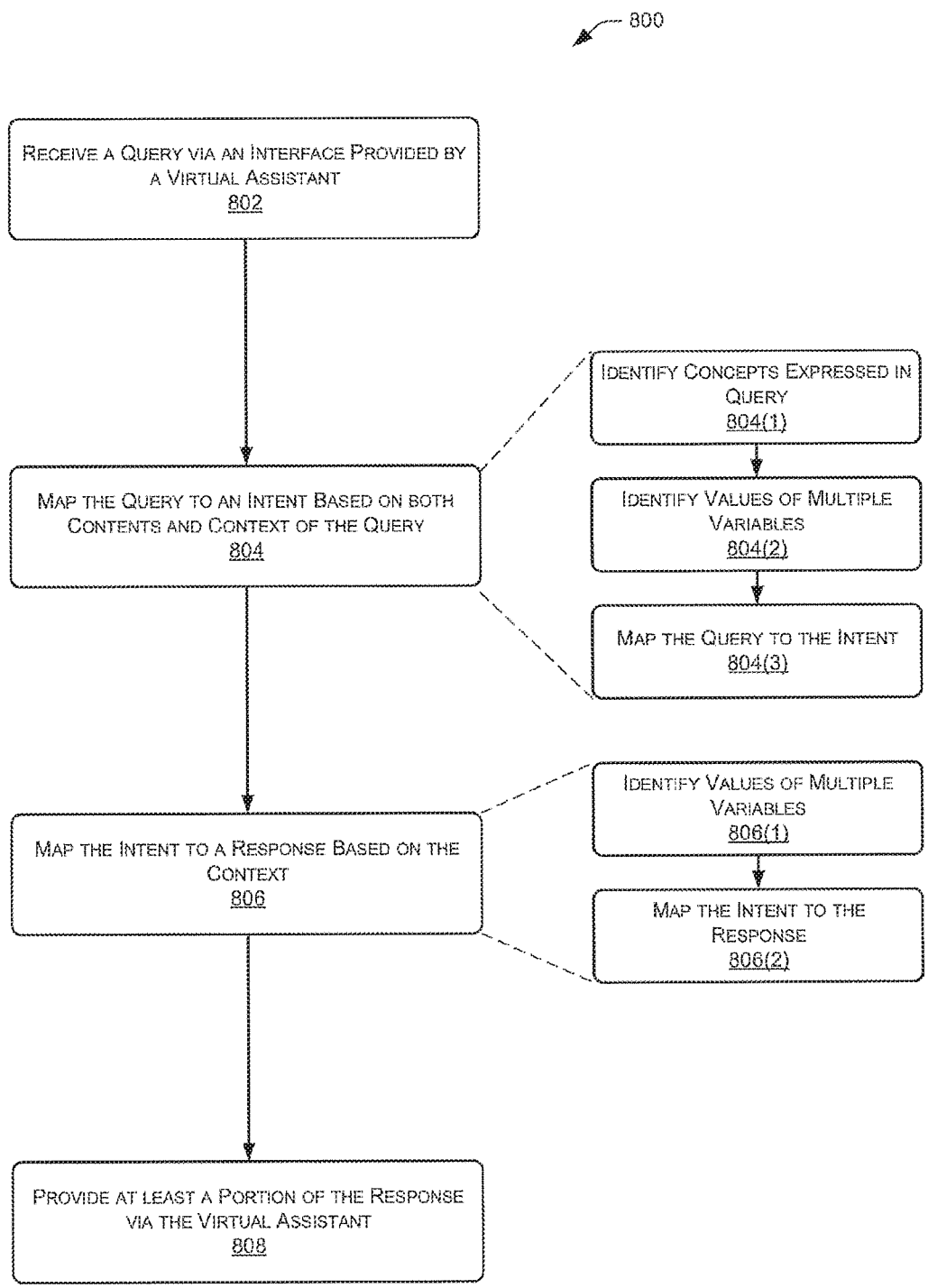
FIG. 8 illustrates additional example flow diagrams for providing variable responses to user queries via virtual assistants.

FIG. 8 illustrates another process 800 for providing variable responses to user queries via virtual assistants. This process may be performed by the virtual-assistant service 116, the service provider 106, the electronic device 104 of the user, and/or some combination thereof. At 802, the process 800 receives a query via an interface provided by a virtual assistant. At 804, the process 800 then maps the query to an intent based on both contents of the query and a context of the query.

In some instances, the operation 804 may comprise a series of sub-operations. At 804(1), the process 800 identifies one or more concepts expressed in the query. At 804(2), the process identifies respective values of multiple different variables that may collectively define the context of the query. Finally, at 804(3), the process 800 maps the query to the intent with reference to the concepts and the values of the multiple variables.

At 806, the process 800 then maps the intent to a response based on the context of the query. The operation 806 may include a series of sub-operations that include, at 806(1), the process 800 identifying values of multiple variables, which may be the same and/or different from the variables used in mapping the query to the intent at 804(3). At 806(2), the process 800 then maps the intent to the response based at least in part on the values of the variables identified at 806(1). Finally, at 808, the process 800 may provide at least a portion of the response to the user via the virtual assistant.

Figure 9:
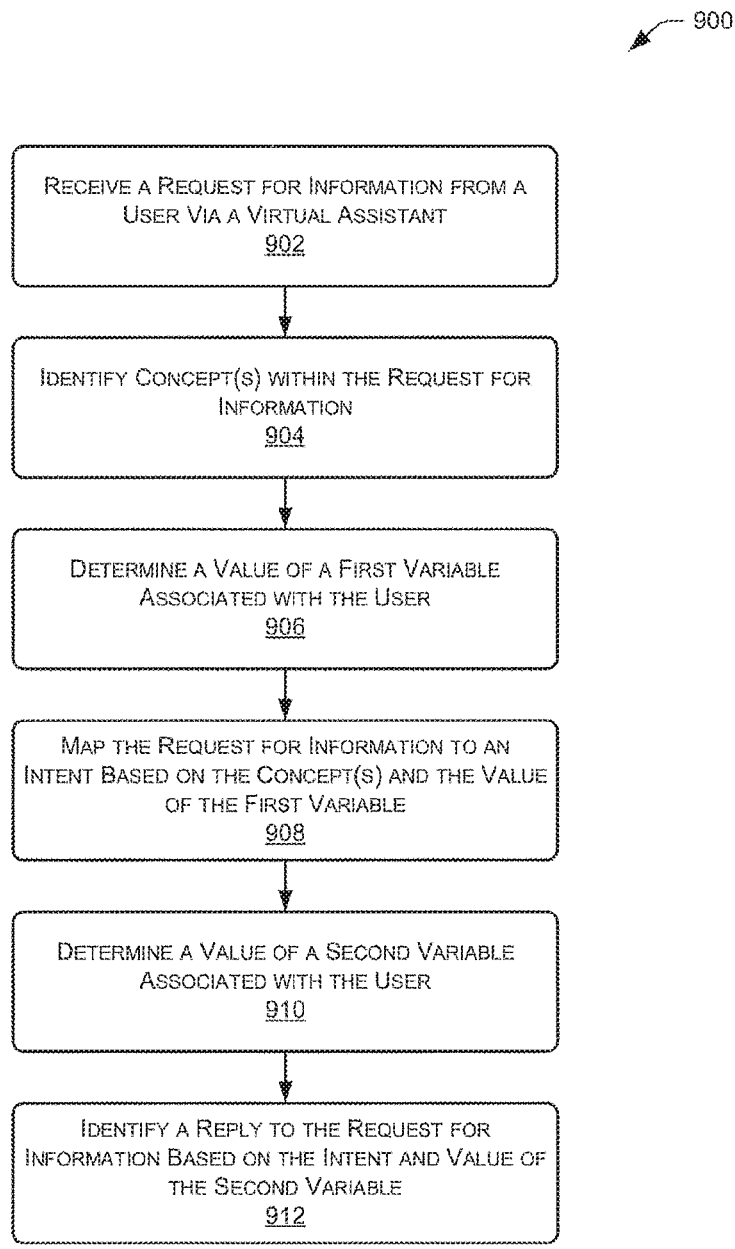
FIG. 9 illustrates additional example flow diagrams for providing variable responses to user queries via virtual assistants.

FIG. 9 illustrates yet another example process 900 for providing variable responses (or "replies") in response to received user queries. Again, this process may be performed by the virtual-assistant service 116, the service provider 106, the electronic device 104 of the user, and/or some combination thereof. At 902, the process 900 receives a request for information from a user via a virtual assistant. At 904, and in response, the process 900 identifies one or more concepts within the request for information. In addition, at 906, the process 900 determines a value of a first variable associated with the user that provided the query.

At 908, the process 900 maps the request for information to an intent based on the identified concepts and the value of the first variable. At 910, the process 900 then determines a value of a second variable associated with the user, which may or may not be different than the first variable. Finally, at 912, the process 900 identifies a reply to the request for information based on the intent and the value of the second variable. The process 900 may then provide this identified reply to a user, as described in detail above.

The identification of relational strategies in a single conversational turn can be structured as a multi-intent detection problem. The user not only wants the task completed (the primary intent), but they may also attempt to build credibility or some common ground with the IVA (the secondary intent). Segments of text such as justification or backstory can be annotated as secondary intent and ignored while determining the primary intent. Once relational language is isolated, a separate classification can determine what relational strategies are in use and how to properly respond.

Multi-intent detection within dialog systems is still an emerging field; in recent work, only one intent is assumed to be present per turn [9]. A few methods exist such as [10] which uses multi-label learning and [11] which employs a two-stage intent detection strategy. However, in [10, 11], multi-intent detection is assumed to be multiple task-oriented intents within a single turn. This disclosure is significantly different, at least in one way, in that secondary intents are relational in nature and therefore must be detected and handled differently.

Figure 10:
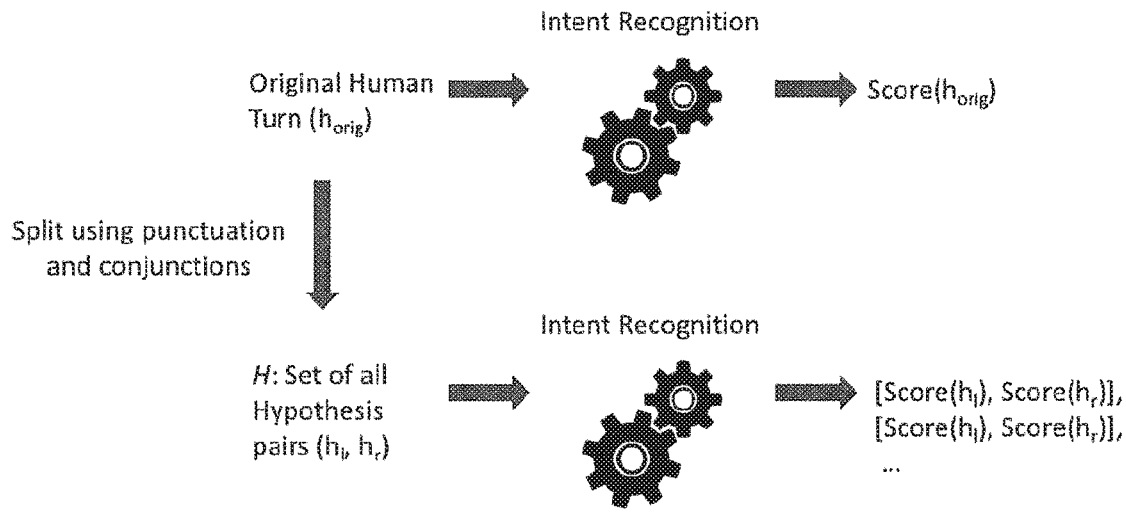
FIG. 10 illustrates an intent recognition model as set forth in the examples of this disclosure.

In one non-limiting embodiment, a partitioning strategy can be implemented for multi-intent detection that is extended to detect relational language and further process it. Although English is used in the following examples, this method can be applied to any language with common conjunctions and punctuation. As visualized in FIG. 10, this disclosure implements a set of segment identifiers in the form of language specific punctuation symbols combined with a dictionary of common language, specific conjunctions such as "and", "but", "because", "so that", and the like, to split each input turn on every occurrence of punctuation or conjunction and form the set of all possible hypothesis pairs (H), demonstrated in Example 1 below.

Example 1

Original turn $h_{orig}$: My mother and I just returned from Florida and they lost our bags. Who do we contact?
Hypothesis pair 1: <My mother>, <I just returned from Florida and they lost our bags. Who do we contact>
Hypothesis pair 2: <My mother and I just returned from Florida>, <they lost our bags. Who do we contact>
Hypothesis pair 3: <My mother and I just returned from Florida and they lost our bags>, <Who do we contact>

The left and right segments, $h_L$ and $h_D$, from every pair h∈H are then fed into the intent classifier independently, and the confidence score of classification on each is recorded. There are many approaches to determining a confidence score that are generally described as probabilities that a result is accurate.

U.S. Pat. No. 9,715,875 (Piernot 2017), which is incorporated herein by reference as if set forth fully below, describes at col. 8, lines 10-61 one non-limiting way to envision this probability problem and determining a confidence score. "In some examples, a probabilistic system can be used to determine whether or not the virtual assistant should respond to the spoken user input by determining a likelihood or confidence score that the user intended for the spoken user input to be directed at the virtual assistant. The probabilistic system can include a machine learning system or classifiers, such as neural networks. Additionally, the probabilistic system can learn and adapt to the user using a feedback loop. In these probabilistic system examples, the likelihood or confidence score can include a numerical or other representation of a calculated probability that the user intended for the spoken user input to be directed at the virtual assistant. The calculated likelihood or confidence score can then be compared to a threshold value to determine whether or not the virtual assistant should respond to the spoken user input. For example, if the calculated likelihood or confidence score is greater than the threshold value, it can be determined that the spoken user input was intended for the virtual assistant. If, however, the calculated likelihood or confidence score is not greater than the threshold value, it can be determined that the spoken user input was not intended for the virtual assistant. The likelihood or confidence score can be determined in any number of ways. For example, the determination can generally include summing positive, negative, and/or neutral contributions from any number of different types of contextual information. For example, the likelihood or confidence score can be calculated using the general formula of P=C1+C2+C3+ . . . +CN, where P represents the likelihood or confidence score that the spoken user input was intended for the user device and C1 . . . CN can be positive, negative, or zero values representing the positive, negative, or neutral contributions to the likelihood or confidence score from the N different types of contextual information. A positive contribution can represent a type of contextual information that suggests that the spoken user input was intended for the virtual assistant, a negative contribution can represent a type of contextual information that suggests that the spoken user input was not intended for the virtual assistant, and a neutral contribution can represent a type of contextual information that is neutral regarding the likelihood that the spoken user input was intended for the virtual assistant. Thus, a large P value can indicate that the spoken user input was likely intended for the virtual assistant, while small or negative P values can indicate that the spoken user input was likely not intended for the virtual assistant. The weight or value that each contextual information contribution adds to the likelihood or confidence score determination can be uniform or non-uniform. Additionally, the weight or value that each contribution adds to the likelihood or confidence score determination can depend on the value of the particular type of contextual information. For example, if contribution C1 depends on the volume of the user's voice, the sign (e.g., +/−) and/or magnitude of C1 can depend on a numerical representation of the volume of the user's voice."

In another document, such as U.S. Pat. No. 10,170,116 (Kelly et al, 2019) incorporated by reference herein, the confidence score is discussed at column 11, lines 39-57. "The different ways a spoken utterance may be interpreted (i.e., the different hypotheses) may each be assigned a probability or other type of a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text data recognized in the audio data 211. The ASR process may also output multiple hypotheses in the form of a lattice or an N-best list with each hypothesis corresponding to a confidence score or other score (such as probability scores, etc.)."

For the purpose of multi-intent detection, the procedure determines if two separate intents are present by comparing the confidence scores for $h_L$ and hr to the score for $h_{orig}$ as shown in Equation 1. As noted, a previously calculated threshold for Equation 1 is stored in computerized memory to determine of an input has more than a single intent joined by partition identifiers such as punctuation marks and language-based conjunction words.

$$\frac{\min\{\text{score}(h_l), \text{score}(h_r)\}}{\text{score}(h_{orig})} > threshold_{multi-intent} \quad (1)$$

If Equation 1 holds, then there are two different intents present in the original input from a user's turn in the human-machine conversation. For this disclosure, this idea extends to partitioning the original turn into segments and using the intent classifier's confidence on each segment for detecting the presence of unnecessary language. If the model observes that either of the following equations hold, using the arbitrary scaling factor s<=0.75 (which is not limiting of the disclosure), the method concludes that $h_L$ (in Eq. 2) or hr (Eq. 3) contains language that is unknown to the intent classifier and is therefore out of the expected scope for intent recognition. The upward pointed arrow symbol below is short hand for "the minimum compared to," whereas a downward pointed arrow (open at the top) would be interpreted as "the maximum compared to".

$$[\text{score}(h_l)<\text{score}(h_{orig})\times s]\wedge[\text{score}(h_r)>\text{score}(h_{orig})] \quad (2)$$

$$[\text{score}(h_l)>\text{score}(h_{orig})]\wedge[\text{score}(h_r)<\text{score}(h_{orig})\times s] \quad (3)$$

In common terms, Equation 2 starts with the premise that one works only with confidence scores on the left side segment of the input that are less than the confidence score of the original entire sentence adjusted by a scaling factor. The scaling factor ensures that the length of the input terms are generally comparable. In Equation 2, after determining the left side confidence scores at issue, then the algorithm selects the left side segments that are minimized as compared to those confidence scores for right side segments that are greater than the confidence score of the original sentence. In the scenarios of Equation 2, the left side segments are deemed non-essential or noisy portions that are not helpful in determining intent.

Equation 3 starts with the premise that one works only with confidence scores on the right side segment of the input that are less than the confidence score of the original entire sentence adjusted by a scaling factor. The scaling factor ensures that the length of the input terms are generally comparable. In Equation 3, after determining the right side confidence scores at issue, then the algorithm selects the right side segments that are minimized as compared to those confidence scores for left side segments that are greater than the confidence score of the original sentence. In the scenarios of Equation 3, the right side segments are deemed non-essential or noisy portions that are not helpful in determining intent.

Example 3 score($h_{orig}$)=0.65
Hypothesis pair 1: confidence score($h_L$)=0.01, confidence score(hr)=0.7
Hypothesis pair 2: confidence score($h_L$)=0.1, confidence score(hr)=0.9
Hypothesis pair 3: confidence score($h_L$)=0.4, confidence score(hr)=0.5

Continuing from the previous example, in Example 3 these examples show that either Hypothesis pair 1 or 2 would satisfy Eq. 2, but as Hypothesis pair 2 scored higher for hr, it would be selected. The segment "they lost our bags. Who do we contact" contains no unnecessary information to determine the user intent of <baggage_claims_contact_info>. Using hr as the primary task-oriented intent as it has the highest score, we proceed to determine the relational segment. Notice that although Eq. 2 and Eq. 3 assume exactly two segments, one can easily extend this idea to work with any number of segments if finer grained detection is desired. For example, to detect n segments of relational language, one can generate n equations of the form:

[score($h_1$)<score($h_{orig}$)×s)∧(score($h_2$)>score($h_{orig}$)×s)∧ . . . ]∧[score($h_n$)>score($h_{orig}$)]

Once separated, relational sections are classified to determine the classes of relational language present. Any multi-class classification method can be used for this, such as a Support Vector Machine, Decision Tree, or Neural Network. Each relational section is evaluated and given one or more of the following tags:

Greeting, Backstory, Justification, Gratitude, Rant, Express Emotion, Other.

Greetings are a common relational strategy humans use to build rapport with other humans and machines [12].

Backstory is a method of self-exposure that may be employed by the customer. In Example 1, the customer included the fact that he or she is attending a graduation as a means of self-exposure. This may be an attempt to build common ground with the agent or it may indicate the importance of the trip and motivate the agent to help the customer succeed.

Justification is used by the customer to argue why the agent should take some action on the part of the customer. For instance, when trying to replace a defective product, a customer may explain how the product failed to establish credibility that the product was at fault.

Gratitude, like greetings, are used by humans to also build rapport with humans and machines [12].

Ranting is a means of expressing dissatisfaction when a customer feels frustrated, ignored, or misunderstood. In computer-mediated conversations, the non-verbal emotional cues present in face-to-face conversations are missing; thus, humans resort to such negative strategies to convey their emotions [13]. For tagging purposes, we define a Rant to encompass any excessive complaining or negative narrative.

Expressing emotions can be a means of showing displeasure when a customer feels a conversation is not making adequate progress or in reaction to an unexpected or disagreeable agent response. This can also indicate joking or other positive emotional expression. The tag Express Emotion is used as a catch-all for any emotional statement that is not covered by Rant. Examples would be: "i love that!", "UGH!", "WHY???".

The Other tag indicates that some or all of the section does not contain any relational language. This is commonly a restatement of the primary intent or facts that can be marked as unnecessary or out of application scope.

Figure 11:
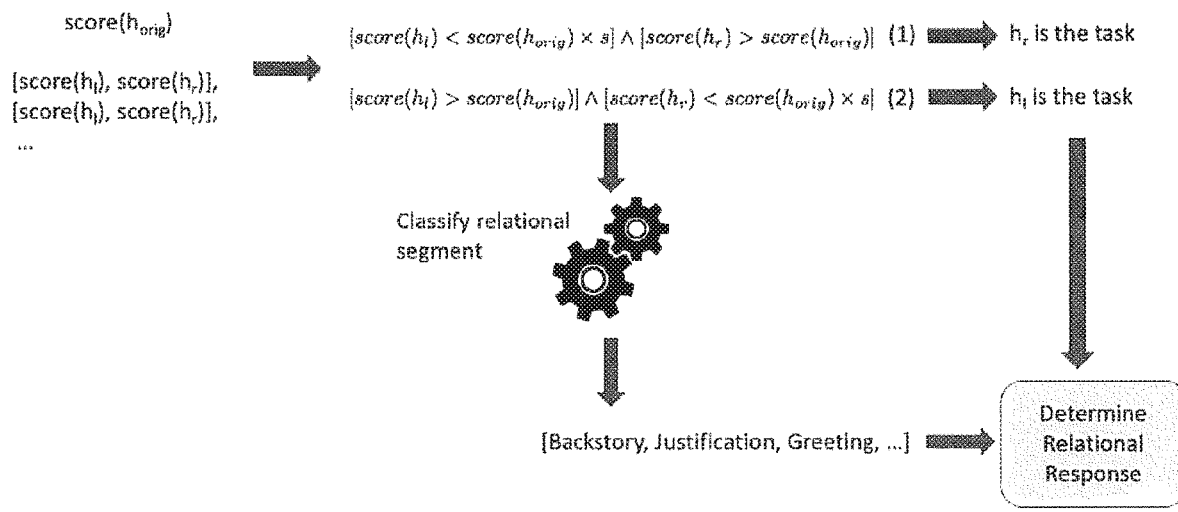
FIG. 11 illustrates an intent recognition model as set forth in the examples of this disclosure.

Once the relational section(s) have been isolated and classified, the IVA can then determine the appropriate action to take based on the task-oriented intent. Given the task, a second component can determine how to respond to the relational classes present. This process is visualized in FIG. 11. For example, if a user is complaining as evidenced by the Ranting class, the IVA can include an apology in its response along with the appropriate action to complete the task. If Justification is present, the IVA can reciprocate by indicating understanding on the importance of the task, while also performing or responding to the primary task-oriented intent.

If the relational segments do not in fact include relational language, as evidenced by the Other class, they can be ignored as out of application scope. The separation of such language will still increase accuracy in determining the correct task-oriented intent for a given human conversational turn.

REFERENCES

[1] S. Levy, Alexa, tell me where you're going next. Backchannel.com, 2016. Available online at https://backchannel.com/alexa-tell-me-where-youre-going-next-739c53ff10b3
[2] C. B. Gibson and S. G. Cohen, Virtual teams that work, JosseyBass, San Francisco, 2003.
[3] D. Ballantyne, Dialogue and its role in the development of relationship specific knowledge, Journal of Business & Industrial Marketing, vol. 19, no. 2, pp. 114123, 2004.
[4] J. A. Holton, Building trust and collaboration in a virtual team, Team performance management: an international journal, vol. 7, no. 3/4, pp. 3647, 2001.
[5] N. W. Coppola, S. R. Hiltz, and N. G. Rotter, Building trust in virtual teams, IEEE transactions on professional communication, vol. 47, no. 2, pp. 95104, 2004.
[6] E. J. de Visser, S. S. Monfort, R. McKendrick, M. A. Smith, P. E. McK-night, F. Krueger, and R. Parasuraman, Almost human: Anthropomorphism increases trust resilience in cognitive agents., Journal of Experimental Psychology: Applied, vol. 22, no. 3, p. 331, 2016.
[7] T. Bickmore and J. Cassell, Relational agents: a model and implementation of building user trust, in Proceedings of the SIGCHI conference on Human factors in computing systems, pp. 396403, ACM, 2001.
[8] J. Y. Chai, C. Zhang, and T. Baldwin, Towards conversational qa: automatic identification of problematic situations and user intent, in Proceedings of the COLING/ACL on Main conference poster sessions, pp. 5764, Association for Computational Linguistics, 2006.
[9] R. Sarikaya, P. Crook, A. Marin, M. Jeong, J. P. Robichaud, A. Celikyilmaz, Y. B. Kim, A. Rochette, O. Z. Khan, X. Liu, et al., An overview of end-to-end language understanding and dialog management for personal digital assistants, in IEEE Workshop on Spoken Language Technology, 2016.
[10] P. Xu and R. Sarikaya, Exploiting shared information for multi-intent natural language sentence classification., in INTERSPEECH, pp. 37853789, 2013.
[11] B. Kim, S. Ryu, and G. G. Lee, Two-stage multi-intent detection for spoken language understanding, Multimedia Tools and Applications, pp. 114, 2016.
[12] M. K. Lee, S. Kiesler, and J. Forlizzi, Receptionist or information kiosk: How do people talk with a robot?, in Proceedings of the 2010 ACM conference on Computer supported cooperative work, pp. 3140, ACM, 2010.
[13] A. Laflen and B. Fiorenza, okay, my rant is over: The language of emotion in computer-mediated communication, Computers and Composition, vol. 29, no. 4, pp. 296308, 2012.

What is claimed is:

1. One or more computing devices for implementing a virtual assistant that emulates human-to-human interaction, the one or more computing devices comprising:
one or more processors and one or more computer-readable media storing computer-executable instructions that, when executed on the one or more processors, cause the one or more processors to perform acts comprising:
causing display of the virtual assistant on or adjacent to a site of a service provider;
receiving, via an interface provided by the virtual assistant, a single query from a user device of a user while the user is engaged in a session on the site of the site provider, wherein the single query comprises a fixed word or phrase;
at least partly in response to receiving the single query:
parsing the single query to identify one or more concepts expressed in the single query;
identifying context associated with at least one of the user or the session of the user on the site;
identifying, from one or more datastores storing indications of intents and at least in part from the one or more concepts, a first intent associated with the single query and a second intent associated with the single query, the first intent being mapped in the one or more datastores to a first plurality of responses and the second intent being mapped in the one or more datastores to a second plurality of responses, wherein the first plurality of responses is different than the second plurality of responses;
calculating a respective confidence score for the first intent, the second intent, and the original query, wherein the confidence score comprises a probability that the identifying of intents is correct;
eliminating a selected one of the first intent and the second intent from the confidence score;
mapping the single query to the first intent based at least in part on a first portion of the context;
identifying a response to the single query from the first plurality of responses and at least in part from a second portion of the context, the second portion of the context being different than the first portion of the context; and
providing at least a portion of the response to the user via the virtual assistant;
wherein the instructions cause the processor to parse the single query into concepts within parsed portions of the single query according to segment identifiers present in the single query; and wherein the instructions cause the processor to compare respective confidence scores of the parsed portions with a corresponding confidence score of the single query after scaling the parsed portions to ensure that the length of compared terms are comparable.

2. The computing device of claim 1, wherein the instructions further cause the processor to annotate the selected one of the first intent and the second intent as secondary intent prior to eliminating the selected one.

3. One or more computing devices for implementing a virtual assistant that emulates human-to-human interaction, the one or more computing devices comprising:
one or more processors and one or more computer-readable media storing computer-executable instructions that, when executed on the one or more processors, cause the one or more processors to perform acts comprising:
receiving a single query from a user device operated by a user;
at least partly in response to receiving the single query:
parsing the single query to identify one or more concepts expressed in the single query;
identifying context associated with the user or a session of the user device interacting with the one or more processors;
identifying multiple intents from the single query;
calculating a respective confidence score for the first intent, the second intent, and the original query;
calculating a primary task oriented intent from the confidence scores;
using the primary task oriented intent and the context, identifying a response to the single query;
providing at least a portion of the response to the user;
wherein the instructions cause the processor to determine if the single query has multiple intents within the concepts by comparing respective confidence scores of the concepts to a corresponding confidence score of the single query; and
wherein the instructions cause the processor to compare respective confidence scores of parsed portions with a corresponding confidence score of the single query after scaling the parsed portions to ensure that the length of compared terms are comparable.

4. The computing device of claim 3, wherein the instructions further cause the processor to annotate the selected one of the first intent and the second intent as secondary intent prior to eliminating the selected one.

5. The computing device of claim 3, wherein the instructions cause the processor to parse the single query into concepts within parsed portions of the single query according to segment identifiers present in the single query.

6. The computing device of claim 3, wherein the instructions cause the processor to determine the concepts with keyword matching using words from the single query.

7. The computing device of claim 3, wherein the instructions cause the processor to determine the concepts by utilizing a hierarchy analysis of words within the single query.

8. The computing device of claim 3, wherein the instructions cause the processor to calculate a respective confidence score for a first intent, a second intent, and the single query, wherein the confidence score comprises a probability that the identifying of intents is correct;
eliminating a selected one of the first intent and the second intent from the confidence score; and
using a remaining one of the first intent and the second intent to identify the response.

9. One or more computing devices for implementing a virtual assistant that emulates human-to-human interaction, the one or more computing devices comprising:
one or more processors and one or more computer-readable media storing computer-executable instructions that, when executed on the one or more processors, cause the one or more processors to perform acts comprising:
causing display of the virtual assistant on or adjacent to a site of a service provider;
receiving, via an interface provided by the virtual assistant, a single query from a user device of a user while the user is engaged in a session on the site of the site provider, wherein the single query comprises a fixed word or phrase;
at least partly in response to receiving the single query:
parsing the single query to identify one or more concepts expressed in the single query;
identifying context associated with at least one of the user or the session of the user on the site;
identifying, from one or more datastores storing indications of intents and at least in part from the one or more concepts, a first intent associated with the single query and a second intent associated with the single query, the first intent being mapped in the one or more datastores to a first plurality of responses and the second intent being mapped in the one or more datastores to a second plurality of responses, wherein the first plurality of responses is different than the second plurality of responses;
calculating a respective confidence score for the first intent, the second intent, and the original query, wherein the confidence score comprises a probability that the identifying of intents is correct;
eliminating a selected one of the first intent and the second intent from the confidence score;
mapping the single query to the first intent based at least in part on a first portion of the context;
identifying a response to the single query from the first plurality of responses and at least in part from a second portion of the context, the second portion of the context being different than the first portion of the context; and
providing at least a portion of the response to the user via the virtual assistant;
wherein the instructions cause the processor to determine if the single query has multiple intents within the concepts by comparing respective confidence scores of the concepts to a corresponding confidence score of the single query; and
wherein the instructions cause the processor to compare respective confidence scores of parsed portions with a corresponding confidence score of the single query after scaling the parsed portions to ensure that the length of compared terms are comparable.

* * * * *